United States Patent
Namizuka

(12) 
(10) Patent No.: US 6,211,967 B1
(45) Date of Patent: Apr. 3, 2001

(54) DEVICE FOR HIGH SPEED TWO BEAM PRINTING WITH PARALLEL PROCESSING OF IMAGE DATA INCLUDING DENSITY CONVERSION AND ENHANCEMENT

(75) Inventor: Yoshiyuki Namizuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/024,290

(22) Filed: Feb. 17, 1998

(30) Foreign Application Priority Data

Feb. 17, 1997 (JP) .................................................. 9-032380

(51) Int. Cl.[7] .......................... H04N 1/407; H04N 1/409; H04N 1/23; G06T 5/00; G06K 15/02
(52) U.S. Cl. ............................. 358/1.2; 358/1.4; 358/1.7; 358/1.9; 358/1.16; 358/447; 358/462; 358/463; 358/455; 382/218; 382/264; 382/269; 382/275; 347/240
(58) Field of Search ................................. 358/459, 458, 358/300, 1.4, 1.7, 1.9, 1.16, 462, 447, 1.2, 463; 382/254, 237, 270, 299, 304, 264, 269, 217, 218, 209; 347/233, 237, 240, 251

(56) References Cited

U.S. PATENT DOCUMENTS

| | | | |
|---|---|---|---|
| 5,036,545 | * 7/1991 | Iida | 382/284 |
| 5,045,869 | * 9/1991 | Isaka | 347/240 |
| 5,050,221 | * 9/1991 | Ohta | 382/177 |
| 5,410,337 | * 4/1995 | Saito | 347/251 |
| 5,805,304 | * 9/1998 | Sekine | 358/448 |

* cited by examiner

*Primary Examiner*—Scott Rogers
(74) *Attorney, Agent, or Firm*—Oblon, Spivak, McClelland, Maier & Neustadt, P.C.

(57) ABSTRACT

An image processing device capable of writing two lines at the same time and applicable to an apparatus using digital image data is disclosed. A data bus width control section controls the bus width of input data. A temporary storage temporarily stores data input thereto. A data control section controls the reading and writing of data out of the temporary storage. A two line section produces two lines for writing two lines of input data at the same time. A data converting section converts parallel data to serial data. A multilevel section transforms an input bilevel image to a multilevel image. A rate varying section varies the rate of multilevel data input thereto. A data selecting section selects processed multilevel image data. A register control section executes register control with at least data stored in a storage included in the multilevel section. Data conversion and transformation to the multilevel image data are effected before the data output from the temporary storage are output from the data selecting section.

8 Claims, 29 Drawing Sheets

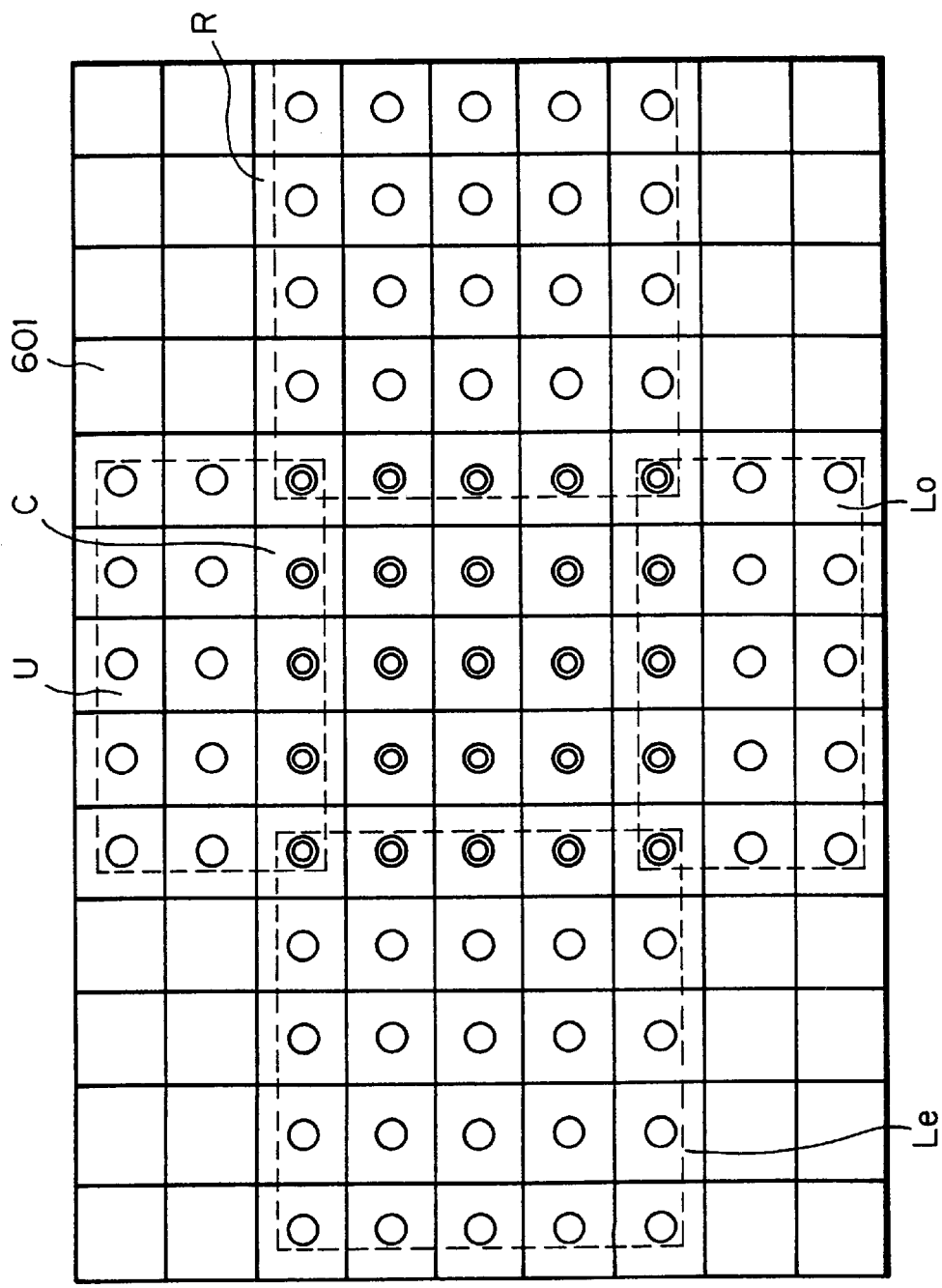

Fig. 8

| PATTERN CODE | | CONTENT |
|---|---|---|
| P12 | SLP | SLOPE OF PIXEL "1":UPWARD RIGHTWARD "0":DOWNWARD RIGHTWARD |
| P11<br>P10 | DIR[1:0] | WHETHER OR NOT TO CORRECT PIXEL; IN THE CASE OF CORRECTION, WHICH OF LINE AND AN ARC<br>"00":CORRECTION NEEDED; PART OF ARC<br>"01":CORRECTION NEEDED; PART OF ⊂ OR ∩<br>"10":CORRECTION NEEDED; PART OF ⊃ OR ∪<br>"11":CORRECTION NEEDLESS |
| P9 | H/V | TO WHICH OF VERTICAL AND HORIZONTAL LINES PIXEL BELONGS<br>"1":PART OF LINE CLOSE TO HORIZONTAL<br>"0":PART OF LINE CLOSE TO VERTICAL |
| P8 | B/W | WHITE/BLACK OF PIXEL<br>"0":WHITE DOT<br>"1":BLACK DOT |
| P7 | U/L<br><br>HORIZONTAL<br>UP/DOWN<br>VERTICAL<br>RIGHT/LEFT | TRANSITION:BLACK→WHITE OR WHITE→BLACK<br>WHEN PIXEL IS "WHITE"("BLACK")<br>"0":BLACK(WHITE) LINE BELOW OR AT RIGHT<br>"1":BLACK(WHITE) LINE ABOVE OR AT LEFT |
| P6<br>P5<br>P4 | GRD[2:0] | GRADIENT OF LINE INCLUDING PIXEL<br>"111":GRADIENT "7"<br>"110":GRADIENT "6"<br>"101":GRADIENT "5"<br>"100":GRADIENT "4" OR "12"<br>"011":GRADIENT "3" OR "11"<br>"010":GRADIENT "2" OR "10"<br>"001":GRADIENT "1"(45°) OR "9"<br>"000":GRADIENT "8" |
| P3 | ONE | IN WHICH OF 1-DOT LINE OR BOUNDARY WITH 2 OR MORE DOTS PIXEL IS PRESENT<br>"0":BOUNDARY WITH 2 OR MORE DOTS<br>"1":1-DOT LINE |
| P2<br>P1<br>P0 | POS[2:0] | POSITION OF PIXEL IN INCLINED LINE<br>• LINE CLOSE TO HORIZONTAL:LEFT<br>• LINE CLOSE TO VERTICAL:UP<br>"111":POSITION "7"<br>"110":POSITION "6"<br>"101":POSITION "5"<br>"100":POSITION "4"<br>"011":POSITION "3"<br>"010":POSITION "2"<br>"001":POSITION "1"<br>"000":NOT OCCURRING AT NECESSARY CORRECTION PIXEL |

Fig. 9
《VERTICAL 3/1》
〈DOWNWARD RIGHTWARD〉
1-DOT LINE
《VERTICAL 3/1》
〈DOWNWARD RIGHTWARD〉
LINE WITH 2 OR MORE DOTS
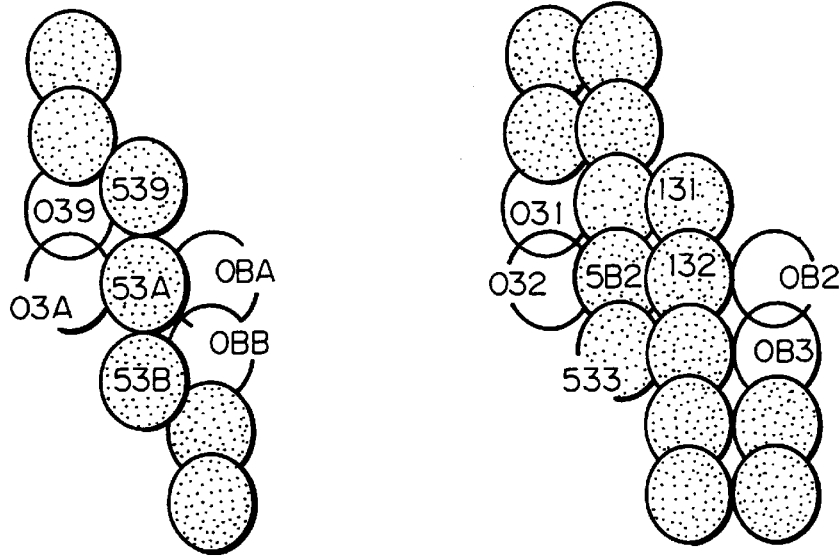
Fig. 10
《HORIZONTAL 1/3》
〈UPWARD RIGHTWARD〉
1-DOT LINE
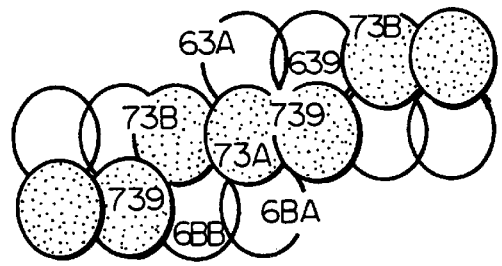
《HORIZONTAL 1/3》
〈UPWARD RIGHTWARD〉
LINE WITH 2 OR MORE DOTS
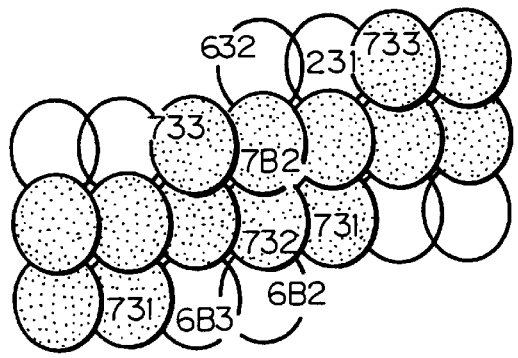

Fig. 14
[BILEVEL MODE; DOUBLE DENSITY IN SUBSCANNING DIRECTION]
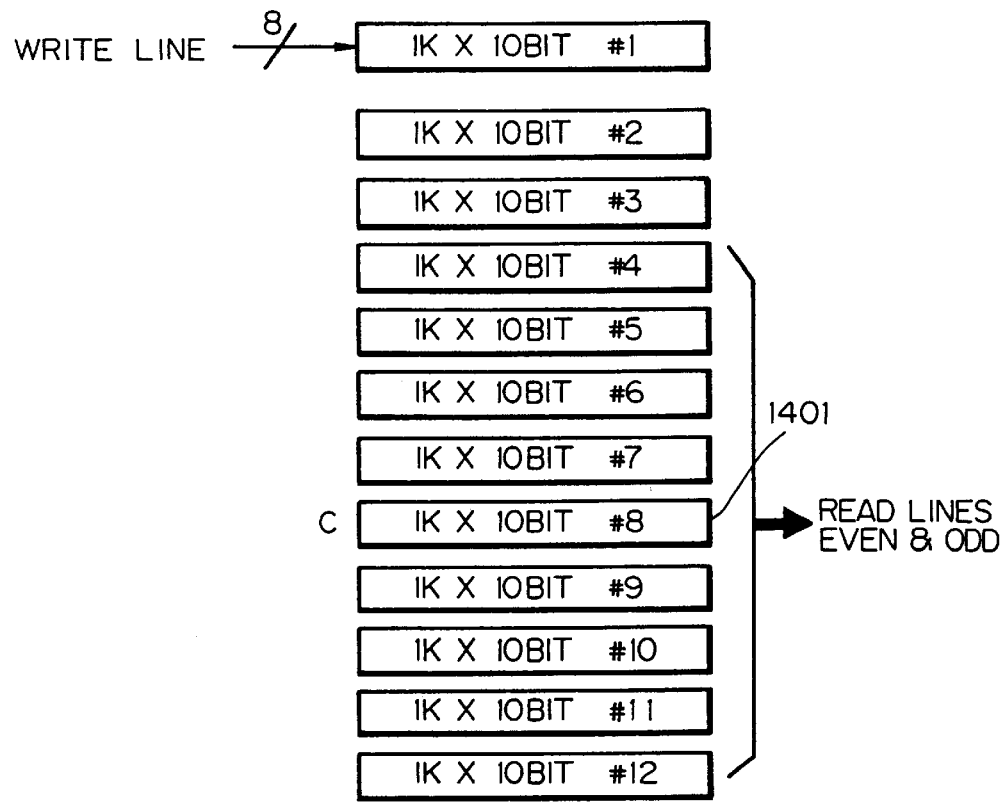
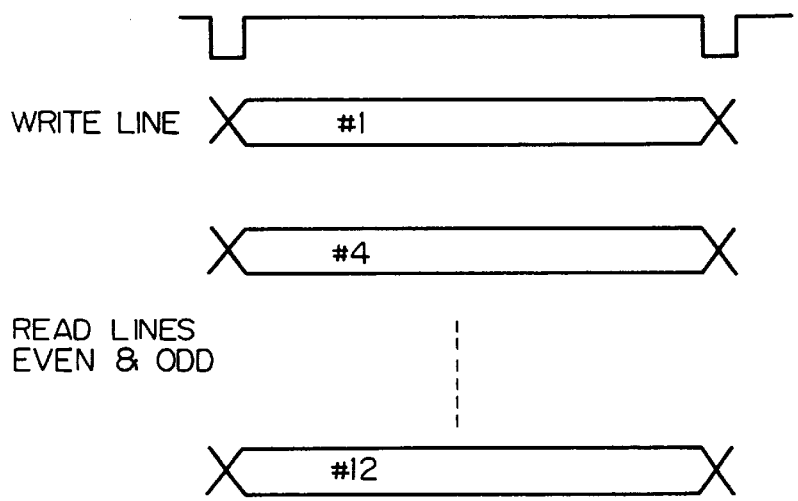

Fig. 15
[BILEVEL MODE: QUADRUPLE DENSITY IN SUBSCANNING DIRECTION]
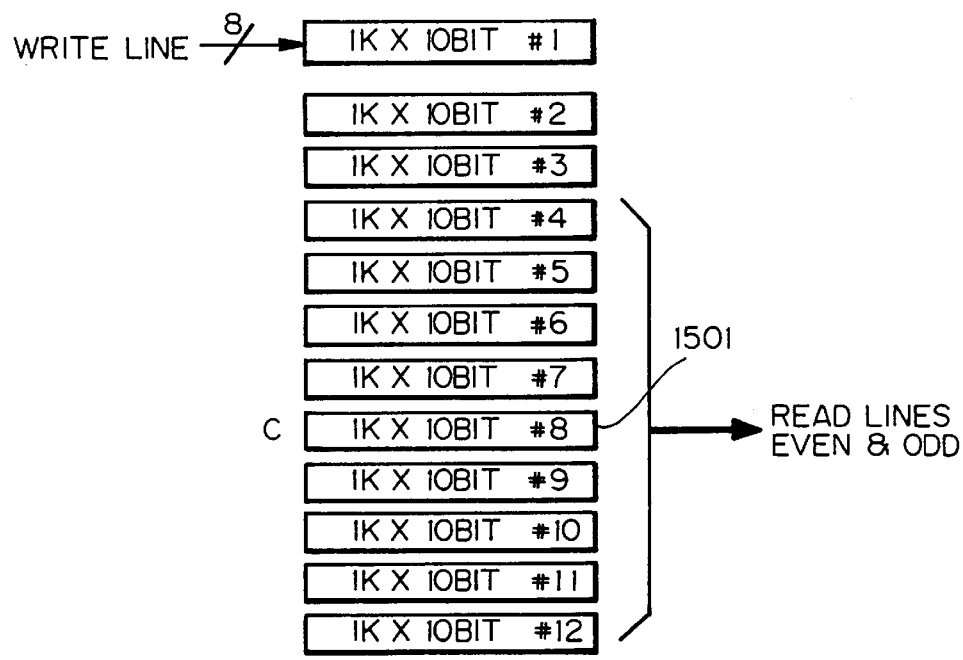
RAM IS USED IN THE SAME MANNER AS IN DOUBLE DENSITY MODE.
THE SAME LINE IS READ TWICE TO CAUSE EACH CODE RAM TO FORM
DOUBLE DENSITY DATA. QUADRUPLE MODE IS EFFECTED WITH EVEN AND ODD.
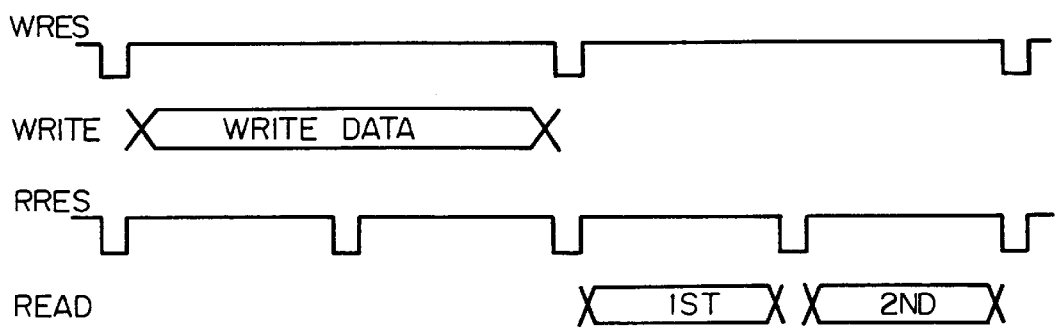

[BILEVEL MODE: DOUBLE DENSITY IN MAIN SCANNING DIRECTION]

DOT COUNT INFORMATION SHOWING PRECEDING AND FOLLOWING PIXELS ARE ADDED TO IDENTICAL CODE INFORMATION TO CAUSE SECONDARY RAM TO OUTPUT DIFFERENT CORRECTION IMAGE INFORMATION.

Fig. 29
[BILEVEL MODE:QUADRUPLE DENSITY IN MAIN SCANNING DIRECTION]
2-BIT DOT COUNT INFORMATION SHOWING 1ST, 2ND, 3RD AND 4TH PIXELS ARE ADDED TO IDENTICAL CODE INFORMATION TO CAUSE SECONDARY RAM TO OUTPUT DIFFERENT CORRECTION IMAGE INFORMATION.
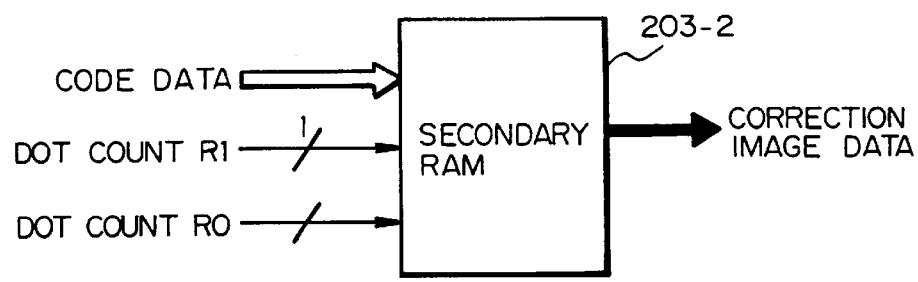
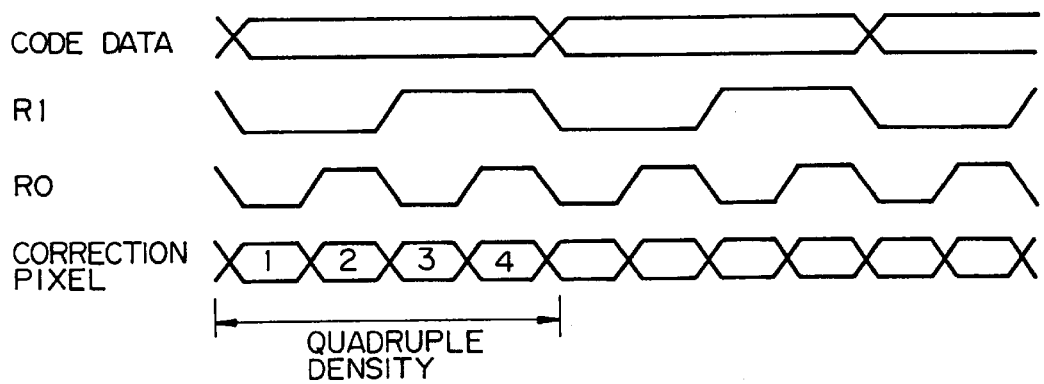

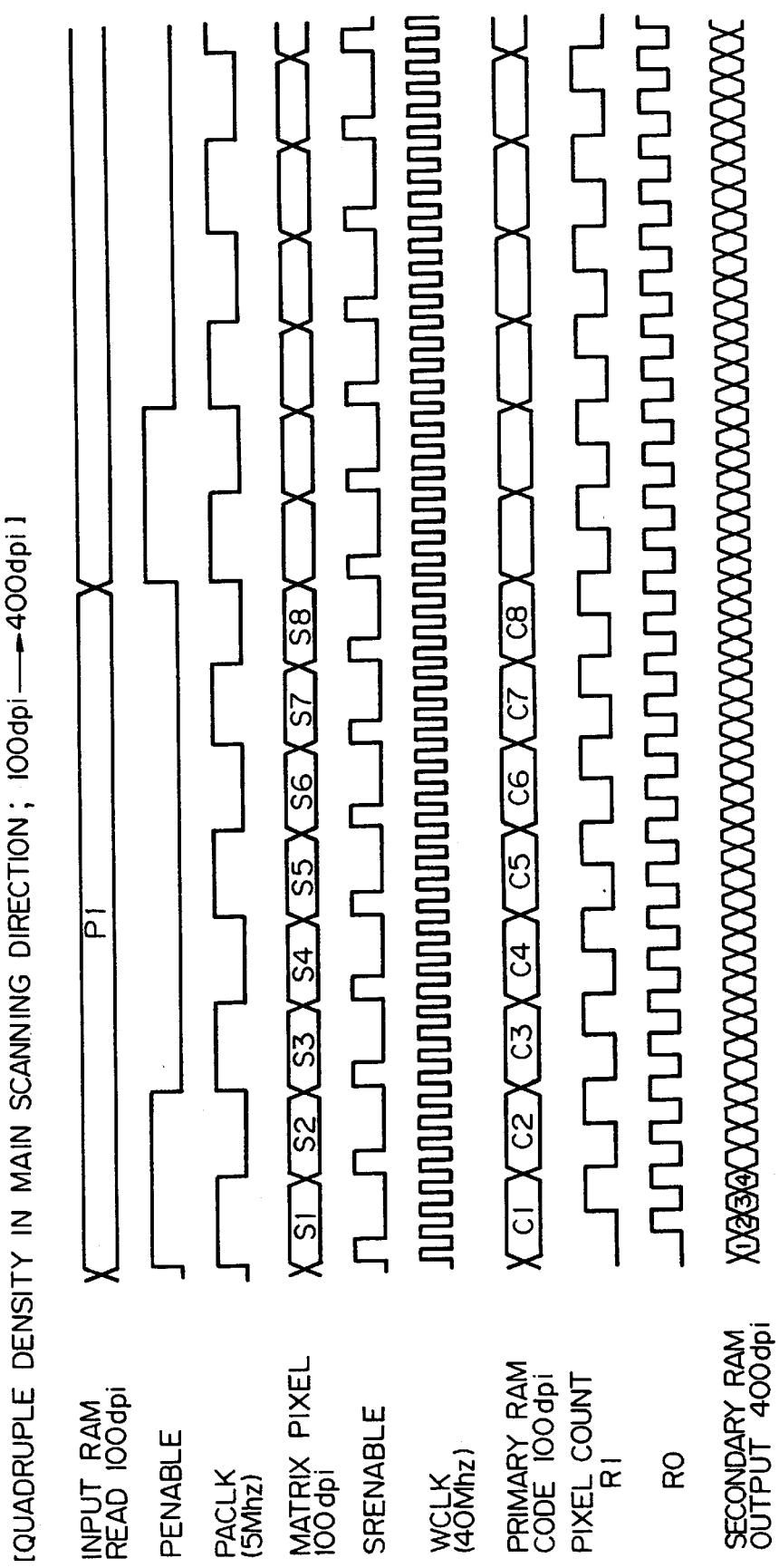

DEVICE FOR HIGH SPEED TWO BEAM PRINTING WITH PARALLEL PROCESSING OF IMAGE DATA INCLUDING DENSITY CONVERSION AND ENHANCEMENT

BACKGROUND OF THE INVENTION

The present invention relates to an image processing device capable of writing two lines at a time which is advantageously applicable to a copier, facsimile apparatus, printer or similar apparatus using digital image data.

Technologies relating to density conversion in the subscanning direction for single beam writing applications are disclosed in, e.g., Japanese Patent Laid-Open Publication No. 7-87321. This document pertains to an image data processing device of the type recognizing the shape of a line at a boundary between a black dot area and white dots which are arranged in a bit map, transforming the characteristic of the line recognized on a dot basis to bit code information, using a part of the code information to determine whether or not data needs correction, and executing correction with dots needing correction in accordance with the code information. The technology taught in the above document is characterized by image data generating means capable of repeatedly generating identical image data arranged in a bit map at the same timing for any desired signal waveform. For example, the image data generating means reads bit map data out of a memory twice in order to double the density of the data in the subscanning direction.

However, the above conventional technology does not effect density conversion in the main scanning direction and is limited to double density control in the subscanning direction.

SUMMARY OF THE INVENTION

It is therefore an object of the present invention to provide an image processing device capable of implementing high speed, high definition writing by converting the density of data to be written in the main scanning direction and subscanning direction independently and executing the separation of the data into two lines and the conversion of an image transfer rate for two beam writing.

In accordance with the present invention, an image processing device capable of writing two lines at the same time includes a data bus with a control section for controlling the bus width of input data. A temporary storage temporarily stores data input thereto. A data control section controls the reading and writing of data out of the temporary storage. A two line section produces two lines for writing two lines of input data at the same time. A data converting section converts parallel data to serial data. A multilevel section transforms an input bilevel image to a multilevel image. A rate varying section varies the rate of multilevel data input thereto. A data selecting section selects processed multilevel image data. A register control section executes register control with at least data stored in a storage included in the multilevel section. Data conversion and transformation to the multilevel image data are effected before the data output from the temporary storage are output from the data selecting section.

BRIEF DESCRIPTION OF THE DRAWINGS

The above and other objects, features and advantages of the present invention will become apparent from the following detailed description taken with the accompanying drawings in which:

FIG. 7 shows areas of FIG. 6, how they overlap each other, and the number of pixels in each area;

FIG. 8 is a table listing correction codes to be generated by the jaggy correcting section on the basis of pattern matching;

FIG. 9 shows specific codes generated by the jaggy correcting section;

FIG. 10 shows other specific codes generated by the jaggy correcting section;

FIG. 14 is a schematic block diagram demonstrating control over the input and output from the buffer RAM to occur in the bilevel mode with a double density in the subscanning direction;

FIG. 15 is a schematic block diagram demonstrating control over the input and output from the buffer RAM to occur in the bilevel mode with a quadruple density in the subscanning direction;

FIG. 29 shows conversion to the quadruple density in the main scanning direction; and FIG. 30 is a timing chart representative of the conversion to the quadruple density in the main scanning direction.

DESCRIPTION OF THE PREFERRED EMBODIMENT

Figure 1:
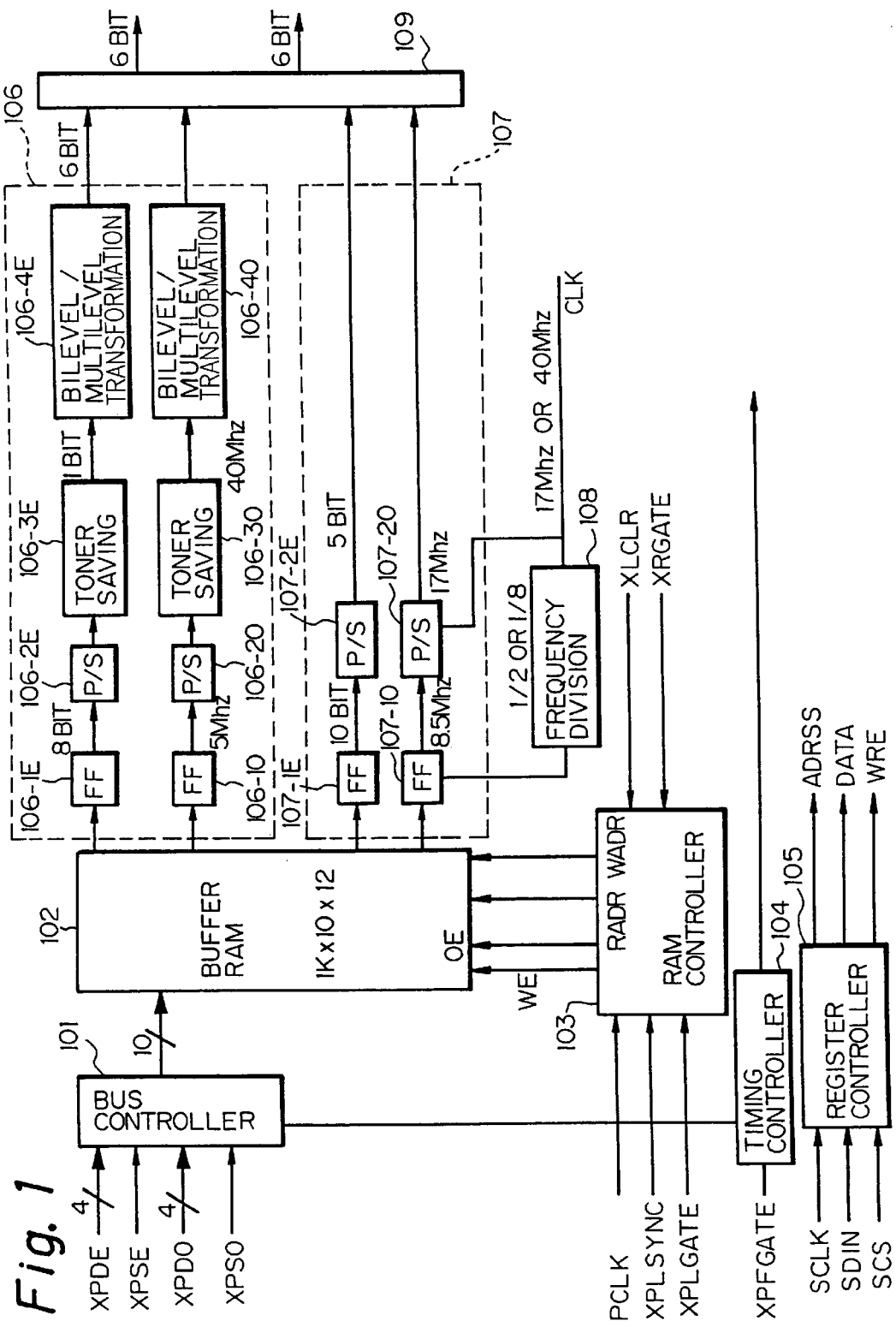
FIG. 1 is a block diagram schematically showing an image processing device embodying the present invention.

Referring to FIG. 1 of the drawings, an image processing device embodying the present invention is shown. As shown, the image processing device includes a bus controller 101, a buffer RAM 102, a RAM controller 103, a timing controller 104, a register controller 105, a bilevel image processing section 106, a multilevel image processing section 107, a frequency division 108, and a selector 109. The bilevel image processing section 106 is made up of flip-flops (FFs) 106-1E and 106-1O, parallel-to-serial (P/S) conversions 106-2E and 106-2O, toner savings 106-3E and 106-3O, and bilevel/multilevel transformations 106-4E and 106-4O. The multilevel image processing 107 is made up of FFs 107-1E and 107-1O and P/S conversions 107-2E and 107-2O.

In the illustrative embodiment, an even pixel and an odd pixel are input in parallel in order to implement high speed writing. Suffixes E and O representative of even and odd, respectively, are added to the reference numerals for distinction. The even pixel is assumed to have a data width of four bits for density (XPDE) and one bit for phase (XPSE). The odd pixel is also assumed to have a data width of four bits for density (XPDO) and one bit for phase (XPSO). In a multilevel mode, the even pixel and odd pixel each having five bits of data are input in parallel. In a bilevel mode, eight pixels of data are input in parallel over the eight-bit width of XPDE and XPDO. It is to be noted that the data width formatted in parallel differs from the bilevel mode to the multilevel mode. The ten bits of input data are merged by the bus controller 101 in the order of XPDE, XPSE, XPDO and XPSO. The merged ten bits of data are written to the buffer RAM 102. A write clock (PCLK), a write enable signal (XPLGATE) and a write reset signal (XPLSYNC) are input from the outside and are synchronous with image data.

The RAM controller 103 controls the writing and reading of data into and out of, respectively the buffer RAM 102. As for writing, the clock and control signals generated in an image reading system are fed to the RAM controller 103. As for reading, signals output from a control system assigned to a polygon motor are fed to the RAM controller 103. A read clock is implemented by a ½ or ⅛ clock output from the frequency division 108. A read enable signal (XRGATE) and a read reset signal (XLCLR) are derived from a polygon motor synchronization detection signal and a valid scanning period. The signals XRGATE and XLCLR are switched by toggling in order to use particular addresses of the buffer RAM 102 for reading or writing.

Two lines of images to be processed are read out of the buffer RAM 102 at the same time. The FFs 106-1E and 106-1O respectively latch the two lines of images, i.e., an even line and an odd line and allow them to be processed in parallel. The bilevel image processing section 106 transforms the eight bits of parallel data to eight pixels of serial data. Specifically, the eight bits of data output from the FFs 106-1E and 106-1O are input to the P/S conversions 106-2E and 106-2O, respectively. The P/S conversions 106-2E and 106-2O convert the eight bits, 5 MHz parallel signals to one bit, 40 MHz serial signals. While the serial data are applied to the toner savings 106-3E and 106-3O, processing for saving toner is not executed at all times, but executed when the consumption of much toner by a plotter which would occur at the time of, e.g., trial printing is not desirable. The bilevel data output from the toner savings 106-3E and 106-3O are transformed to multilevel data by the bilevel/multilevel transformations 106-4E and 106-4O, respectively. The multilevel data have four bits for density and two bits for phase, i.e., six bits in total. In the multilevel image processing section 107, the P/S conversions 107-2E and 107-2O convert the ten-bit data to two pixels of data, thereby restoring five bits of data serially. The multilevel image processing section 107 extends one bit of input phase information to two bits. The selector 109 selects, based on the multilevel/bilevel input mode, either one of buses corresponding to the two lines.

The register controller 105 sets a mode in the image processing device. The register controller 105 receives data SDIN synchronous with a clock SCLK from an external CPU (Central Processing Unit) not shown. A signal SCS, which will be described, corresponds to chip selection. While data and a n address are input to the register controller 105 in the form of serial data, the controller 105 converts them to an address ADRSS having sixteen bits and data DATA having eight bits in parallel. The register controller 105 uses the signal SCS as a trigger signal for the serial data system and additionally generates write enable signals meant for various registers.

Figure 2:
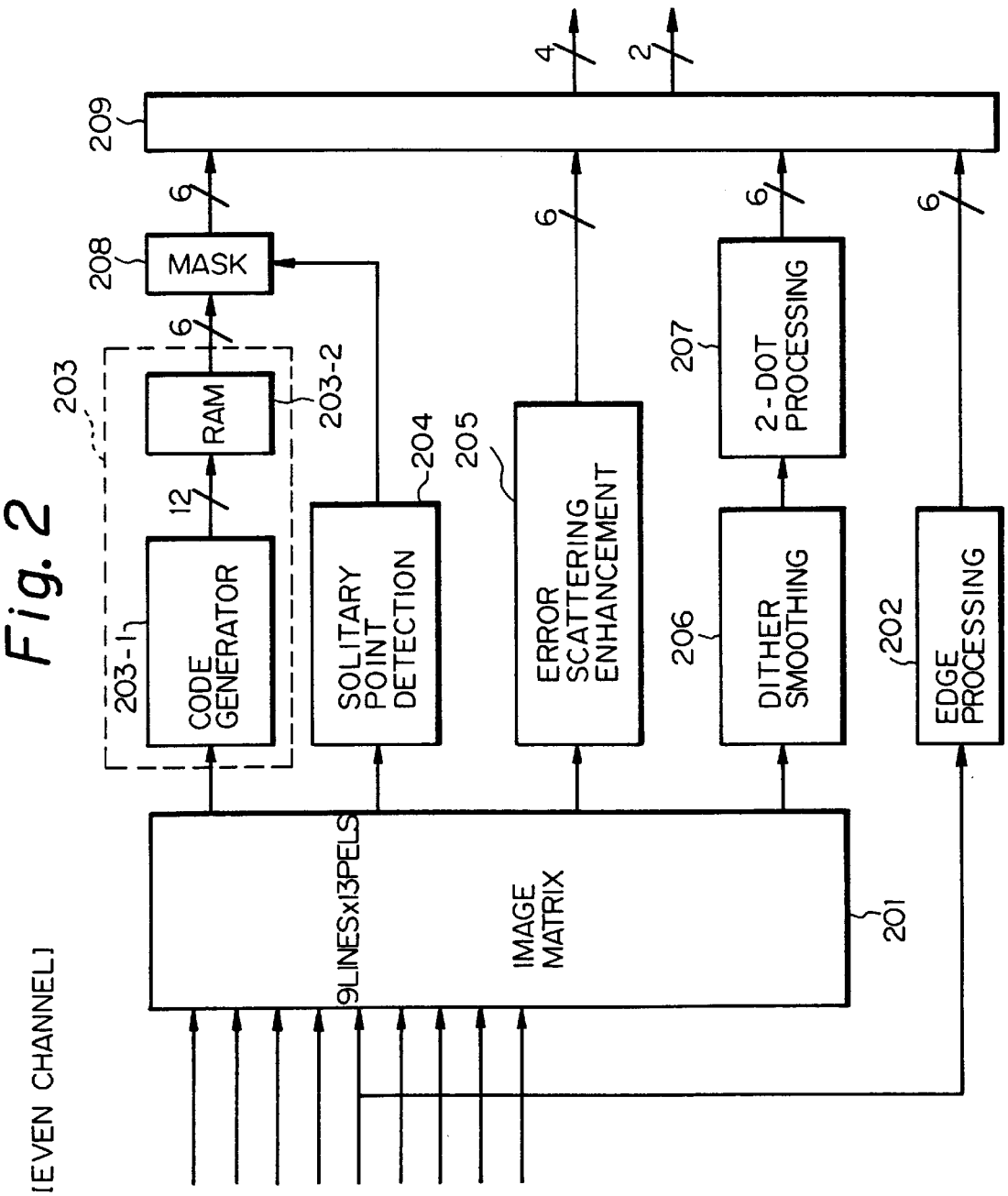
FIG. 2 is a block diagram schematically showing a specific configuration of a bilevel/multilevel converting section included in the illustrative embodiment.

FIG. 2 shows a specific configuration of one of the bilevel/multilevel transformations 106-4E and 106-4O which are identical in configuration and respectively assigned to the even line and odd line. As shown, the bilevel/multilevel transfomation, labeled 106-4, has an image matrix 201, an edge processing 202, a jaggy correction 203, a solitary point detection 204, an error scattering enhancement 205, a dither smoothing 206, a two-dot processing 207, a mask 208, and a selector 209. The jaggy correction 203 is made up of a code generator 203-1 and a pattern RAM 203-2.

Nine lines of line data read out of the buffer RAM 102 are input to the bilevel/multilevel transformation 106-4 via the P/S conversion, labeled 106-2, and toner saving, labeled 106-3, associated with the transformation 106-4. The image matrix 201 produces thirteen delayed data from each of the nine lines of data and thereby generates a bidimensional 9 (lines)×13 (pixels) matrix. The transformation 106-4 accesses the matrix at a time so as to execute bilevel/multilevel transformation with the individual data. At this instant, only the edge processing 202 processes one line of data without using the bidimensional image matrix.

The jaggy correction 203 executes pattern matching by using the image matrix output from the image matrix 201. Specifically, the code generator 203-1 generates twelve-bit code data by pattern matching and feeds them to the pattern RAM 203-2. The pattern RAM 203-2 is a RAM adapted for image correction and outputs image correction data corresponding to an input code. The correction data are downloaded in the RAM 203-2 beforehand. The solitary point detection 204 detects, by pattern matching, a solitary point in a 3×3 image area including a pixel being observed. The mask 208 removes a pixel corresponding to a solitary point detected. Whether or not to mask such a pixel can be selected by switching the mode.

The error scattering enhancement 205 smooths a texture with a band pass filter for holding a line image, and generates a phase signal based on the arrangement of pixels in the main scanning direction. The dither smoothing 206 filters a bilevel dither pattern with a 5×5 or 9×9 low pass filter so as to output a false multilevel signal. The two-dot processing 207 averages intervals between the nearby pixels of the false multilevel signal, thereby outputting phase information. The selector 209 selects one of such multilevel data derived from the bilevel data, depending on the mode. The selector 209 outputs six bits of data consisting of four bits for density and two bits for phase.

Figure 3:
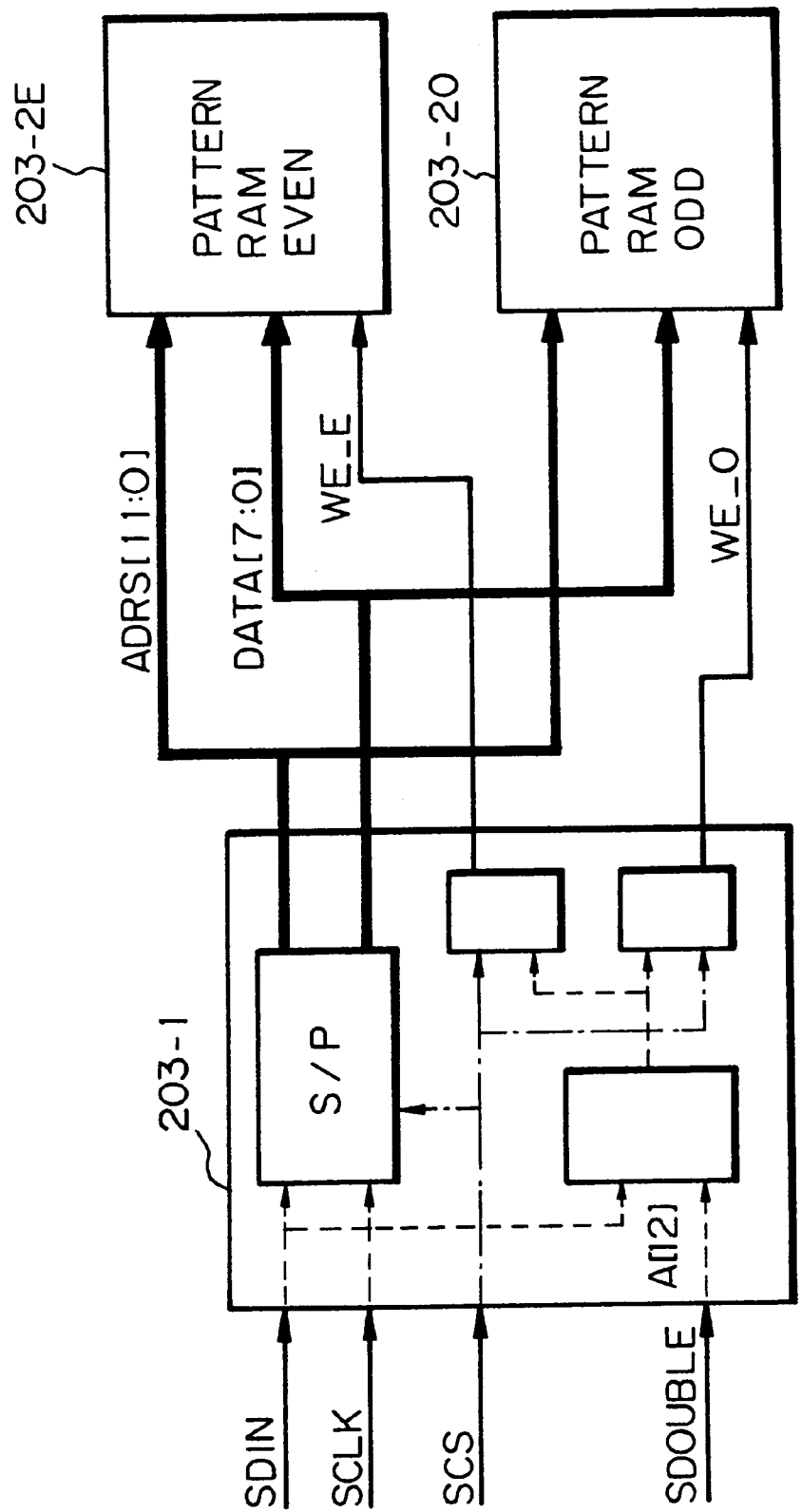
FIG. 3 shows how data are written to a pattern RAM (Random Access Memory) included in a jaggy correcting section shown in FIG. 2.

How the data are written to the pattern RAM 203-2 of the jaggy correction 203 will be described with reference to FIG. 3. First, the register controller 105 decodes the data DATA and address ADRSS. Then, the external CPU sends the serial data SDIN to the register controller 105 in synchronism with a transfer clock SCLK. The beginning of a data sequence is defined by SCS mentioned earlier. While the serial data SDIN have twenty-four bits of data, lower eight bits and upper sixteen bits respectively constitute data DATA and an address ADRSS. Upper three of the sixteen ADRSS bits are used for decoding the addresses of the RAM and internal register. Upper one of the remaining thirteen bits (A[12]) is used to switch an even channel and an odd channel together with a signal SDOUBLE. When the signal SDOUBLE is in its low level, a bilevel single density mode is set up. In this mode, the same data are simultaneously written to the twelve-bit addresses of pattern RAMs 203-2E and 203-2O without regard to the value of A[12]. The pattern RAMS 203-2E and 203-2O are assigned to the even channel and odd channel, respectively.

When the signal SDOUBLE is in its high level, a bilevel double density mode is set up. In this case, particular data are written to each of the pattern RAMs 203-2E and 203-2O. The pattern RAM 203-2E is accessed when A[12] is in its low level, and the pattern RAM 203-2O is accessed when A[12] is in its high level. As for the access, write enables WE_E and WE_O respectively assigned to the pattern RAMs 203-2E and 203-2O are controlled. The pattern RAM 203-2 may be either one of synchronous RAM and an asynchronous RAM.

Figure 4:
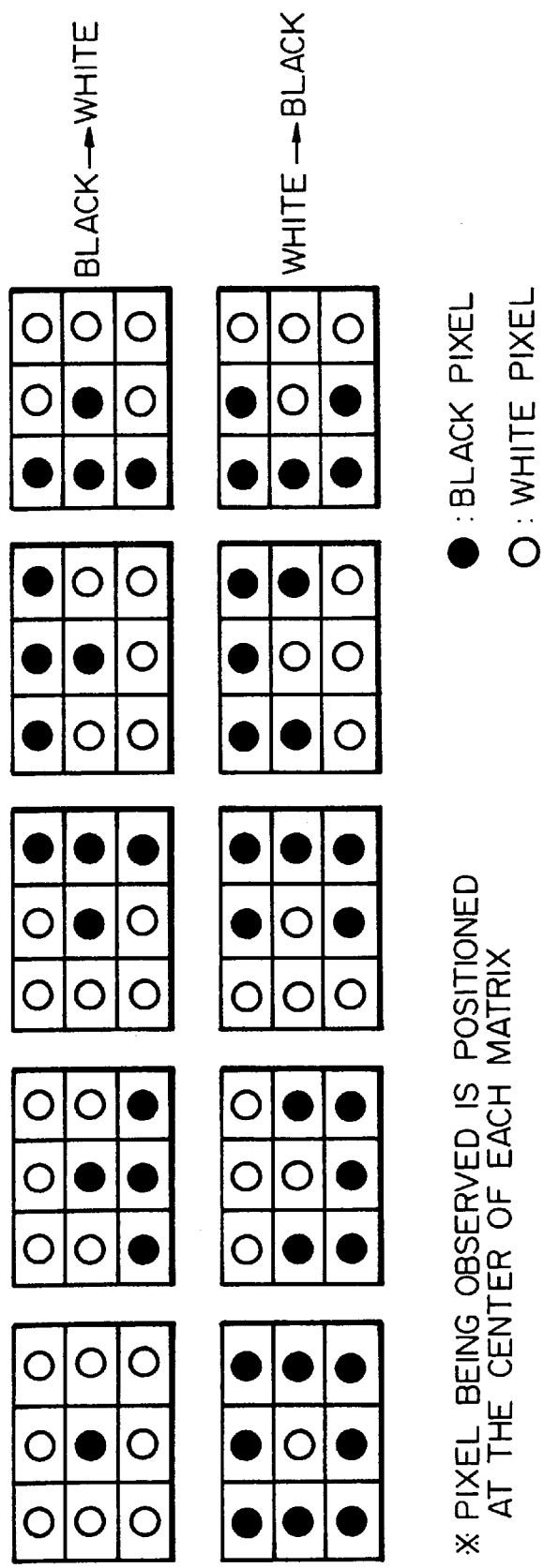
FIG. 4 shows matrix patterns for the detection of a solitary point.

FIG. 4 shows matrix patterns for detecting a solitary point. In FIG. 4, the center pixel is assumed to be a pixel being observed and determined whether or not it is solitary. Connection of the center pixel with the surrounding pixels is determined by pattern matching. In each of the upper five pixel patterns shown in FIG. 4, the center black pixel is a solitary dot and replaced with white. In each of the lower five pixel patterns, the center white pixel is a solitary dot and replaced with black. In the illustrative embodiment, the solitary point detection 204 outputs a level invert signal while the mask 208 effects black/white replacement.

Figure 5:
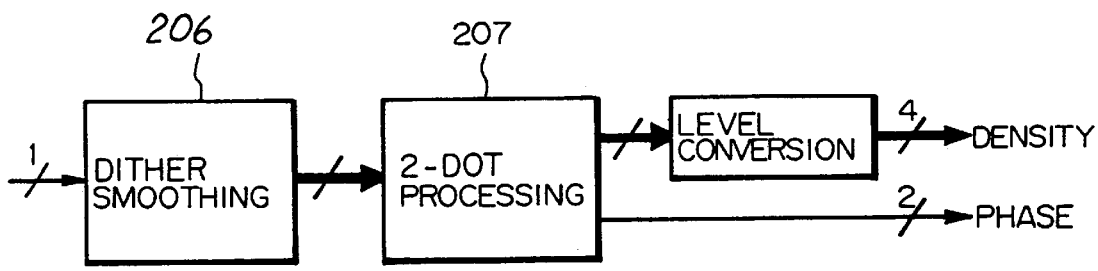
FIG. 5 demonstrates dither smoothing and dot averaging processing particular to the illustrative embodiment.

FIG. 5 shows the operation of the dither smoothing 206 and two-dot processing 207. As shown, the dither smoothing 206 executes 5×5, 7×7 and 9×9 smoothing filter processing with the 9 (lines)×13 (pixels) image matrix. While one-bit bilevel signal is input to the dither smoothing 206, the smoothing 206 removes high frequency components contained in the signal. There are shown four different filter coefficients, i.e., No. 0 to No. 3 by way of example. The filter averages the intervals between the even pixels and the odd pixels in the main scanning direction. While the resulting values are mean values, the phase signals are distinguished from each other. Two-dot image data is generated with the even pixel and odd pixel positioned in the right phase and left phase, respectively. While the phase data are directly output, the density data are transformed to four-bit width data by level transformation.

Figure 6:
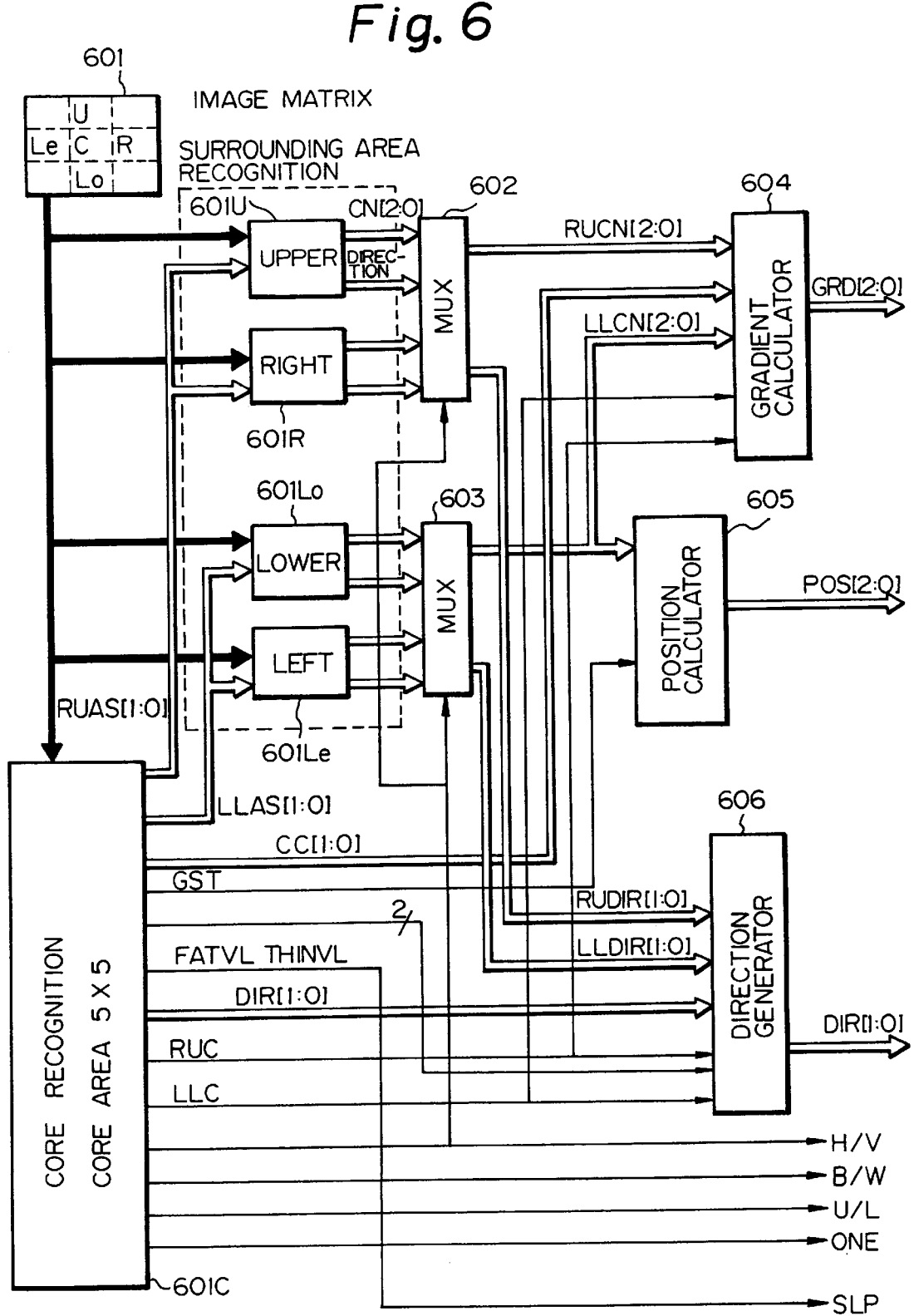
FIG. 6 is a block diagram schematically showing a specific configuration of the jaggy correcting section.

The jaggy correction 203 is shown in detail in FIG. 6. As shown, the 9 (lines)×13 (pixels) image matrix is divided into five blocks and subjected to pattern matching block by block. Specifically, the above image matrix is divided into a 5×5 core or center area C, an upper area U above the core area C, a lower area Lo below the center area C, a left area Le at the left of the center area C, and a right area R at the right of the center area C. How the areas C, U, Le and R overlap each other and the number of pixels of the individual area are shown in FIG. 7. A core recognition 601C determines whether the pixel of the core area C being observed is white or black, to which of a horizontal line and a vertical line the pixel belongs, whether or not the pixel is a one-dot line segment, whether the pixel, if it is white, is positioned above (at the left of) or below (at the right of) a black pixel, whether or not the pixel is representative of the beginning of a step, and determines the number of continuous pixels and the connection thereof to the surrounding areas.

An upper area recognition 601 U, a lower area recognition 601Lo, a left area recognition 601Le and a right area recognition 601R each determines the number of continuous pixels and the direction of a gradient in the respective area. When the pixel of the core area C being observed is determined to be a part of a horizontal line, area information relating to the right area R and left area Le are referenced. When the same pixel of the core area C is determined to a part of a vertical line, area information relating to the upper area U and lower area Lo are referenced. For example, assume that the pixel of the core area C being observed is a part of a horizontal line. Then, a gradient calculation 604, a position calculation 605 and a direction generator 606 respectively generate code information GRD, POS and DIR by referencing the number of continuous pixels and gradient in the right area R and those in the left area Le. If both the right area R and left area Le show upward rightward gradients, then the pixel of the core area C is determined to be a part of an upward rightward line to be corrected. If the right area R and left area Le respectively show an upward rightward gradient and a downward rightward gradient, then the pixel of the core area C is determined to be a pixel included in a downward convex arc. This is the code DIR. The number of continuous pixels in each of the left area Le, core area C and right area R is the gradient code GRD while the position of one of the continuous pixels being observed is the position code POS.

FIG. 8 lists correction codes to be output from the jaggy correction 203 as a result of pattern matching. There are shown in FIG. 8 the direction of a slope of a pixel being observed, a flag DIR distinguishing a straight line, an arc, and a pixel not needing correction, a horizontal/vertical line H/V containing the pixel being observed, a black/white pixel B/W representative of the pixel being observed, a transition U/L from black to white or from white to black, a gradient GRD of pixels including the pixel being observed, a definition ONE distinguishing a line segment of one dot or a boundary portion of two or more dots, and a position POS showing the position of the pixel being observed in an inclined line segment. These values in combination define a jaggy of a line segment.

Figure 11:
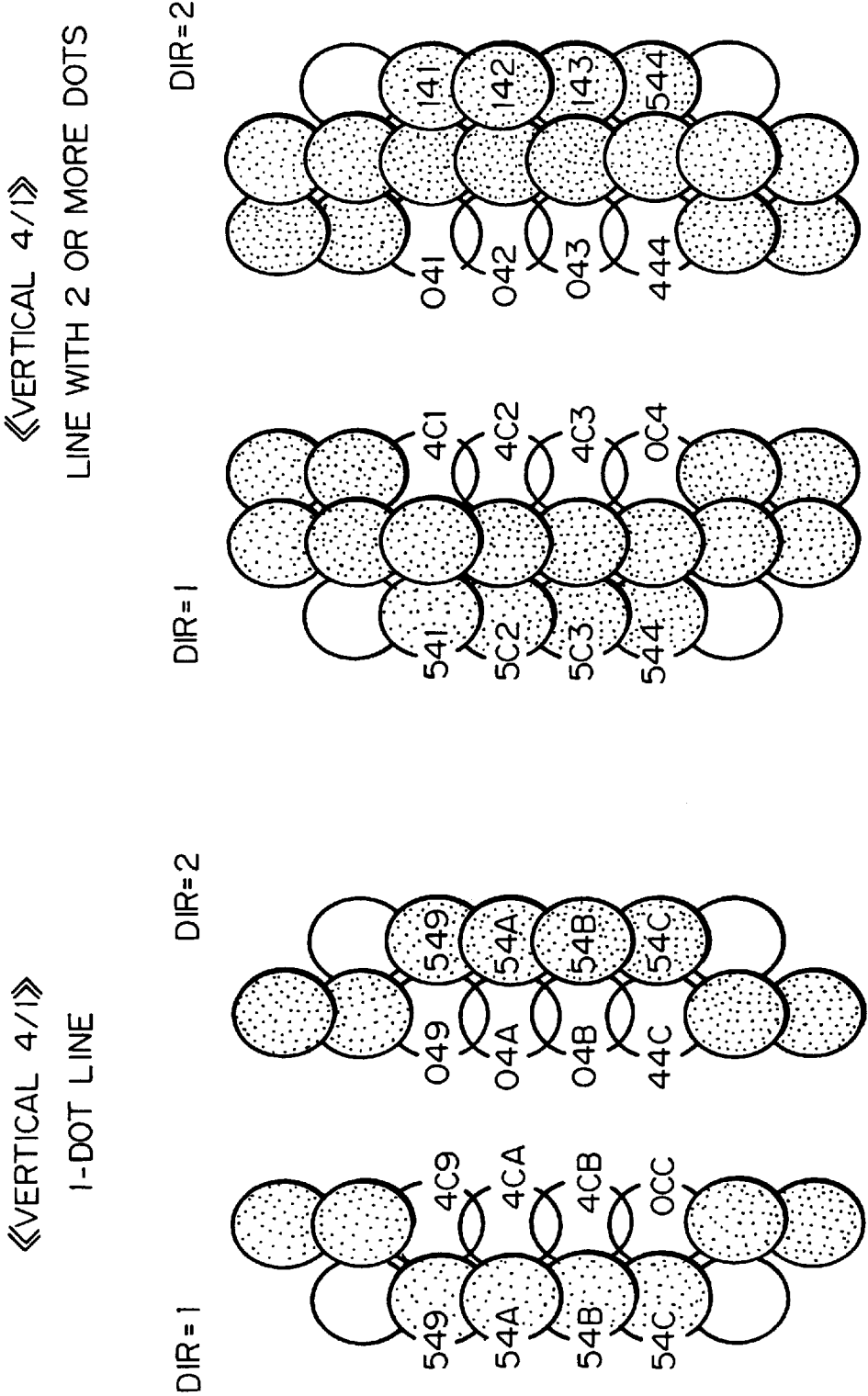
FIG. 11 shows still other specific codes generated by the jaggy correcting section.

FIGS. 9–11 show specific codes output from the jaggy correction 203, i.e., an eleven-bit code excluding DIR. FIGS. 9 and 10 each shows a part of a straight line to be corrected, so that a flag DIR=0 is output. FIG. 11 shows an arc; a flag DIR=1 and a flag DIR=2 are respectively output for "(" and ")". In the downward rightward one-dot line shown in FIG. 9, a code "039" is output at the upper left white pixel. A binary notation of "039" is "00000111011". Therefore, there hold SLP=0, H/V=0, B/W=0, U/L=0, GRD=3, ONE=1 and POS=1 in FIG. 8 except for DIR. These codes show that the line is a part of a downward rightward line close to a vertical line, that the pixel of the line being observed is a white pixel, and that the pixel being observed is positioned at the right of a black line. As for the length of a jaggy, three pixels constitute a one-dot line. The pixel being observed is the first pixel of the inclined line, as counted from the top.

As for an upward rightward line having two or more dots, as shown in FIG. 10, a code "731" is output at the rightmost black pixel on the third line. This code shows that the black pixel is included in an upward rightward line close to a horizontal line, that a white line is present below the black pixel, that the length of a jaggy is three pixels and forms a boundary portion of two or more dots, and that the pixel being observed is the rightmost pixel in the inclined line. Likewise, a particular code is generated for each of the specific arc patterns shown in FIG. 11; the data are identical with straight line data except for DIR.

Reference will be made to FIGS. 12–15 for describing control over the input and output from the input buffer RAM 102. As shown, the buffer RAM 102 is made up of twelve RAMs 1201–1212 each having 1 k×10 bits. The RAMs 1201–1212 are controlled for reading and writing by toggle control, thereby implementing two data lines for two-beam writing.

Figure 12:
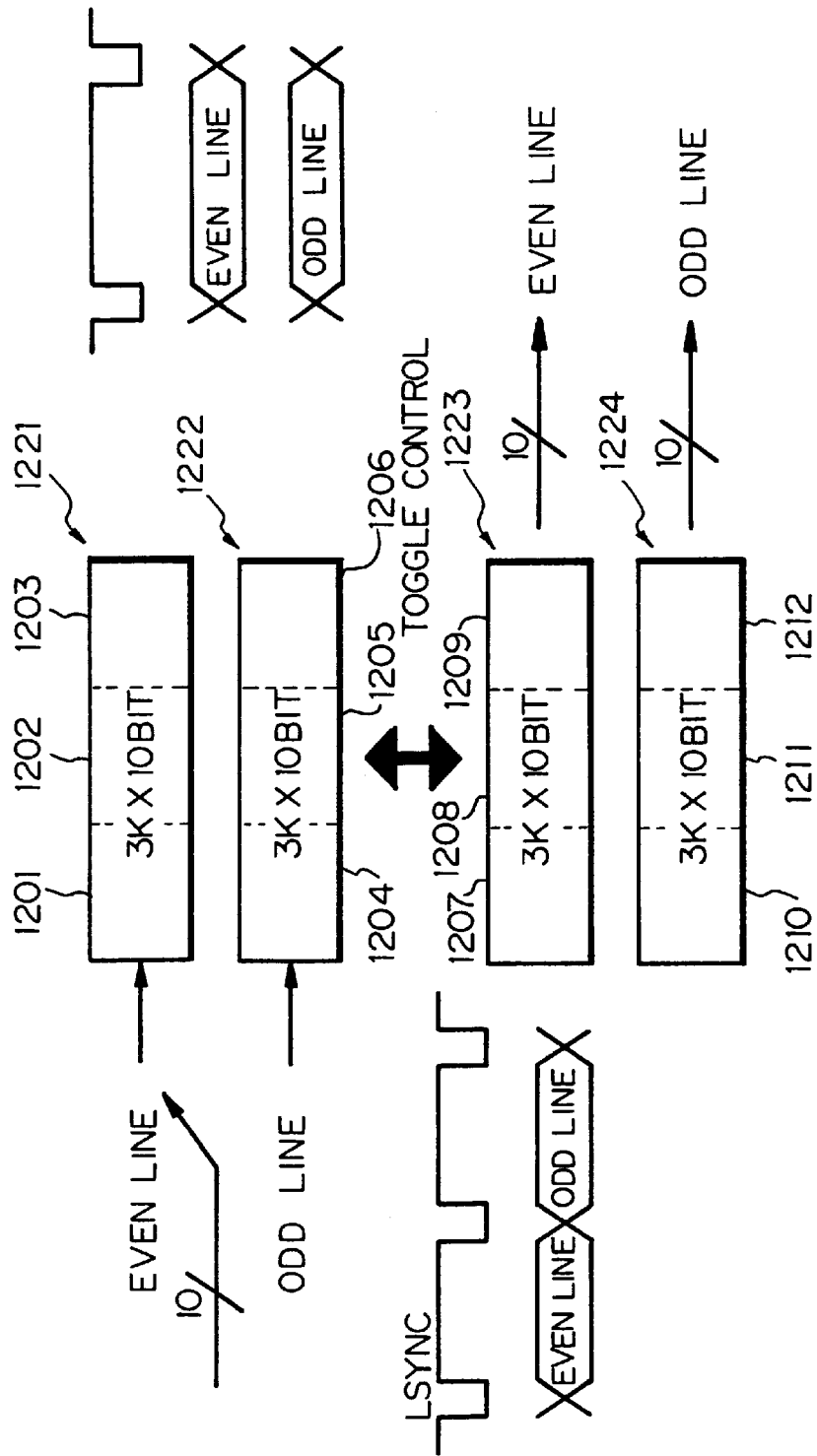
FIG. 12 is a schematic block diagram demonstrating control over input and output from an input buffer RAM included in the illustrative embodiment to occur in a multilevel mode.

Specifically, FIG. 12 shows a configuration in the multi-level mode. In this configuration, when the horizontal width of a paper is read at a resolution of 400 dpi (dots per inch), about 5,000 pixels of image data are transferred. In the illustrative embodiment one line of input multilevel data can be accommodated if 2,500 addresses are available, because two pixels are arranged in parallel. The 1 k×10 bits RAMs 1201–1212 are connected by threes in order to form four RAM groups 1221, 1222, 1223 and 1224, as illustrated. Two of the four RAM groups 1221–1224 and the other two of the same are switched by toggle control for reading and writing.

First, the initial even line data are written to one of the RAMs, and then odd line data are written to the other RAM in response to the next write signal Lsync. In response to the following Lsync, the RAMs having stored the two lines of data are switched so as to read out the data out of those RAMs. At the same time, the other RAMS from which data have been read out are switched in order to store data. The even line and odd line are read out at the same time. The read/write toggle control is executed once for two consecutive write signals Lsync.

Figure 13:
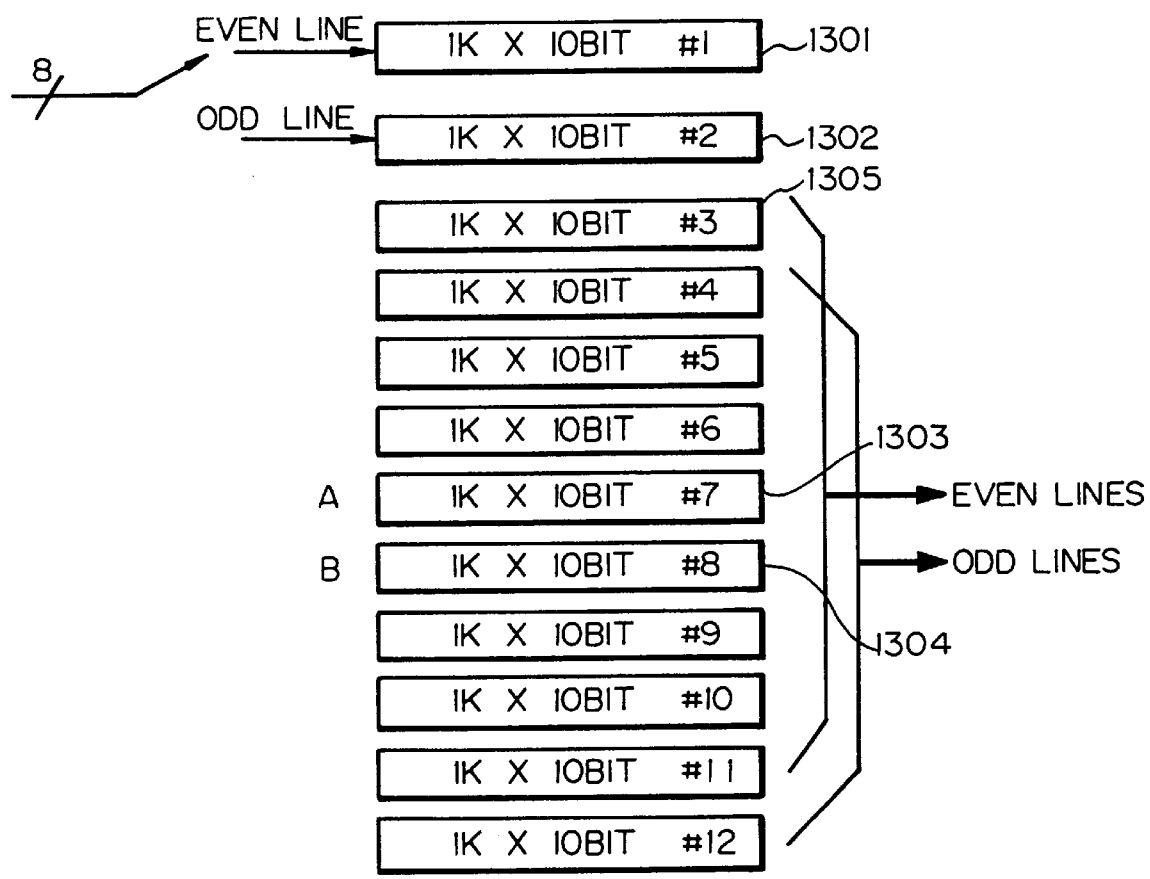
FIG. 13 is a schematic block diagram demonstrating control over the input and output from the buffer RAM to occur in a bilevel mode with a single density in the subscanning direction.

FIG. 13 demonstrates RAM control executed in the bilevel mode with a single density in the subscanning direction. Toggle control for writing two lines and then reading the even line and odd line at the same time is the same as in the multilevel mode. In the bilevel mode, not two lines but nine lines are read out for each of the even channel and odd channel so as to implement two lines for two beams. In FIG. 13, the RAM to write data is switched in response to every write signal Lsync so as to sequentially store image data. The toggle switching is effected in a circulation fashion. In the specific condition shown in FIG. 13, RAM #3 1305 stores the currently oldest image data. A RAM #2 1302 having stored image data older than the current oldest data and a RAM #1 1301 having stored image data even older than the data of the RAM #2 by one line are switched from reading to writing. Nine lines whose center is a RAM #7 A_RAM 1303 are read out at the same time for the even channel while nine lines whose center is a RAM #8 B_RAM 1340 are read out at the same time for the odd channel.

FIG. 14 shows RAM control executed in the bilevel mode with a double density in the subscanning direction. To implement two lines, nine lines of data identical in content are output for both of the even channel and odd channel. Nine lines of image data whose center is a RAM #8 C_RAM 1401 are read out of the buffer RAM 102 as even lines and odd lines. The toggle is switched in response to every signal Lsync. This mode differs from the multilevel mode and bilevel, single density mode in that write resetting and read resetting are controlled at the same period.

FIG. 15 shows RAM control executed in the bilevel mode with a quadruple density in the subscanning direction. To implement two lines, nine lines of data identical in content are output for both of the even channel and odd channel, as in the double density mode. The difference is that, in the quadruple density mode, the nine lines of data are read out twice. Double density processing is executed with the same data channel by channel, so that the two-beam writing system performs quadruple density conversion. Specifically, nine lines of image data whose center is a RAM 1501 are read out of the buffer RAM 102 for the even channel and odd channel. For each duration of a write signal WRES input to the RAM 102, a read signal RRES appears twice so as to cause the same line to be read twice. The data are read out before one line of data are fully written, so that the data are free from conflicts. In addition, the data are prevented from outrunning each other during reading.

Figure 16:
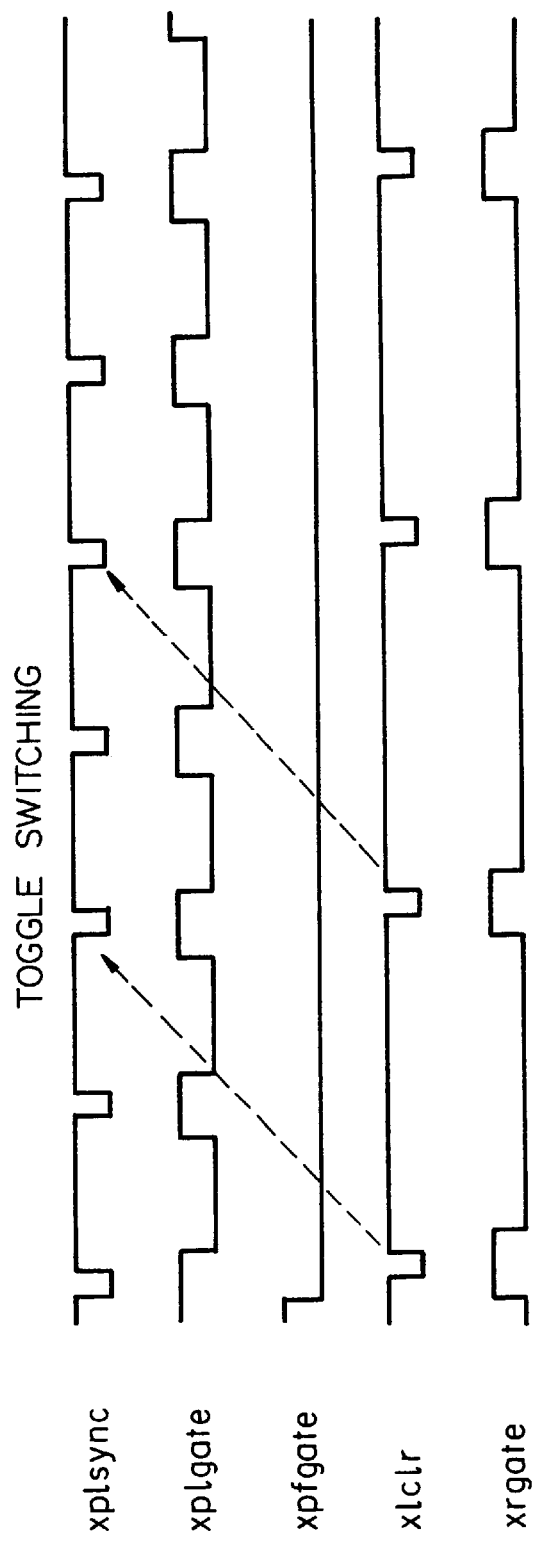
FIGS. 16, 17 and 18 are timing charts respectively associated with FIGS. 13, 14 and 15.
Figure 17:
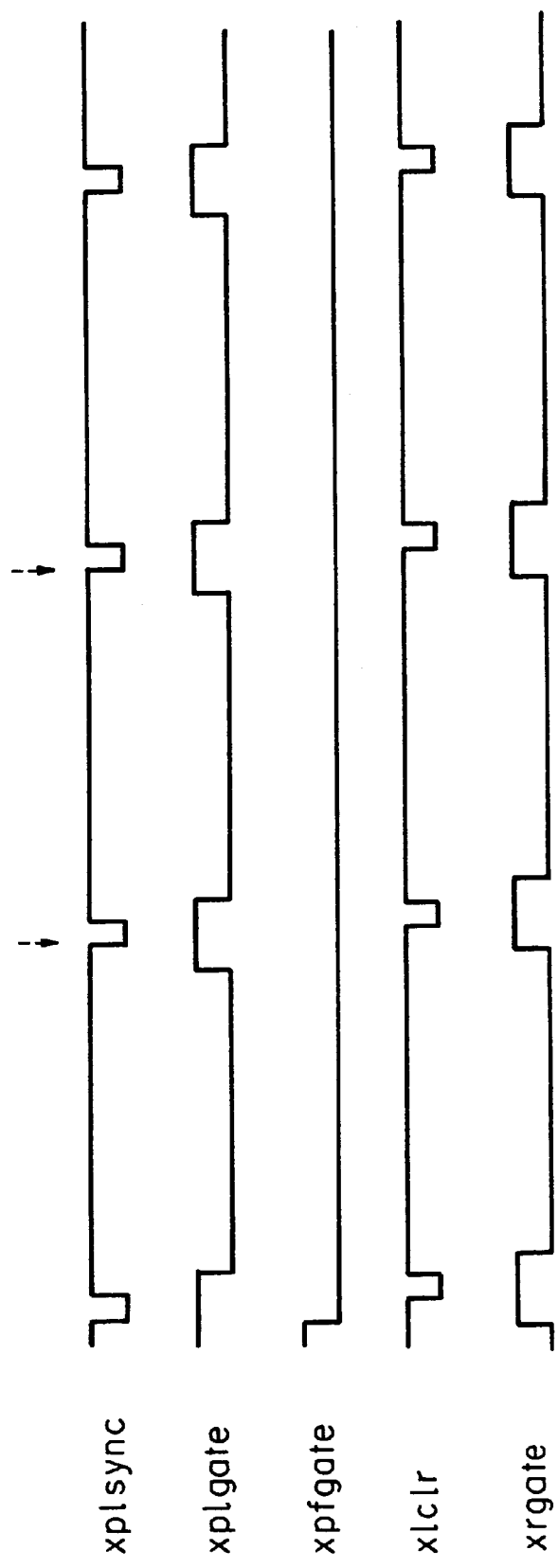
Figure 18:
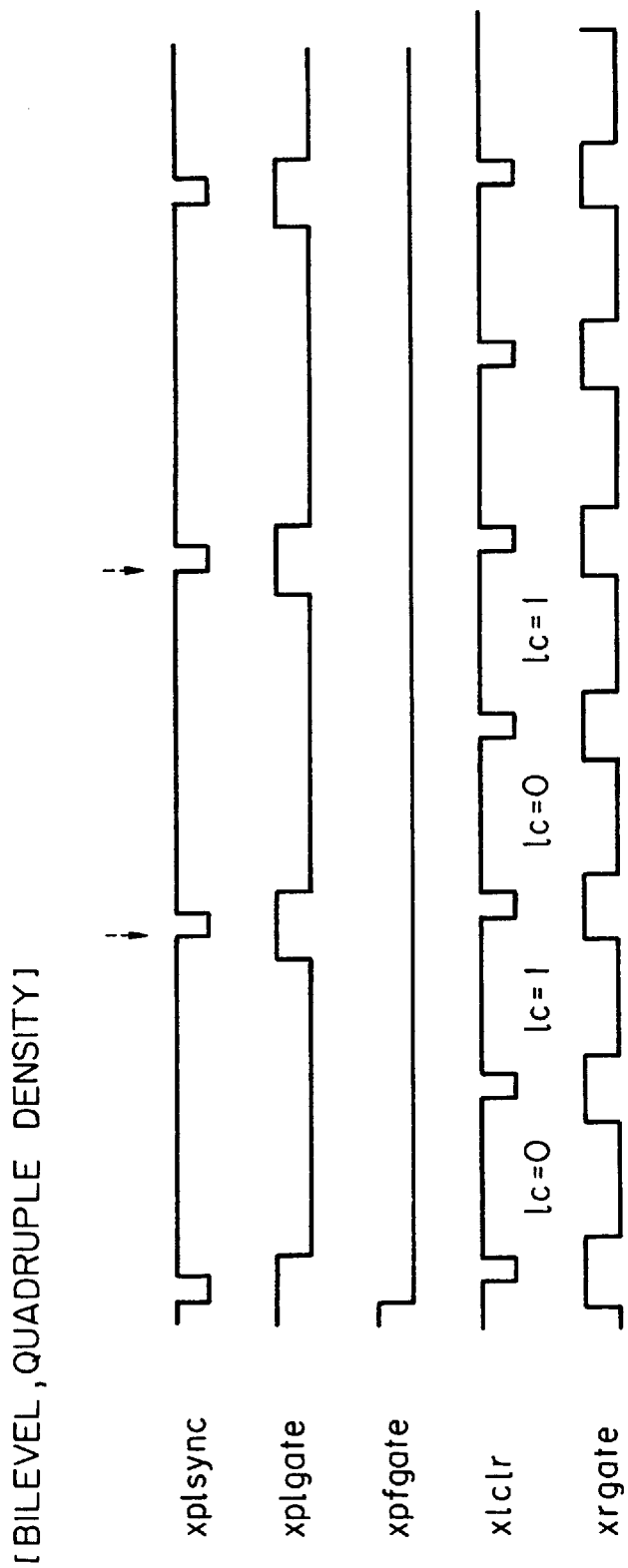

Reference will be made to FIGS. 16–18 for describing the timings for switching the buffer RAM 102 for the toggle control. FIGS. 16, 17 and 18 respectively relate to the multilevel mode and bilevel, single density modes, the double density mode, and the bilevel, quadruple density mode. There are shown in FIGS. 16–18 a write address write reset signal xplsync, a write enable signal xplgate, a sub-scanning direction valid signal xplgate, a read address read reset signal xlclr, and a read enable signal xrgate which are active low control signals.

As shown in FIG. 16, in the multilevel and bilevel, single density modes, two lines are written in response to two write reset signals xplsync, and two lines are read out at the same time in response to a single read reset signal xlclr. The signal xlclr has a period double the period of the signal xplsync. The read/write toggle switching of the RAM is effected while the write reset signal xplsync is active two consecutive times after the activation of the read reset signal xlclr. The RAM is switched as soon as reading completes.

As shown in FIG. 17, in the bilevel, double density mode, the writing period and reading period are coincident. Because the signals xplsync and xlclr vary at the same period, the RAM is toggled after reading at the time when the read reset signal xplsync asserts.

As shown in FIG. 18, in the bilevel, quadruple density mode, write resetting is controlled at a period double the period of read resetting. Because the signal xlclr is reset twice, the same data are read out of the RAM. Because toggling is effected for writing following reading, it is effected at the time of asserting of the signal xplsync. The quadruple density mode differs from the double density mode in that because the same data are read out twice, a flag 1c (line count) is added in order to distinguish data read out first and data read out next. This flag 1c is 1 for the data read out first or 1 for the data read out next. This is effected with each of the even channel and odd channel.

Figure 19:
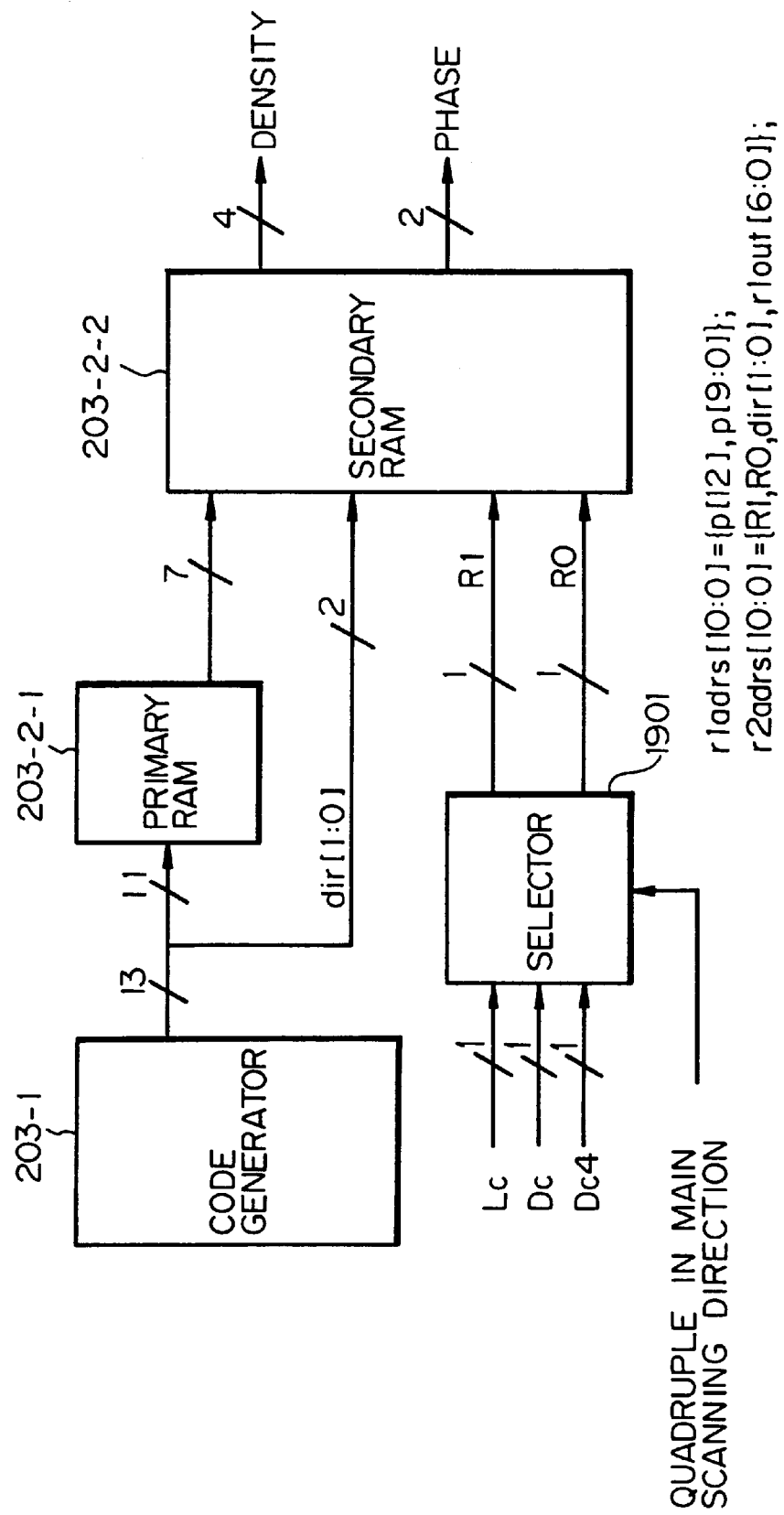
FIGS. 19 and 20 each show a primary and a secondary RAM constituting the RAM of the jaggy correction and how they are used.
Figure 20:
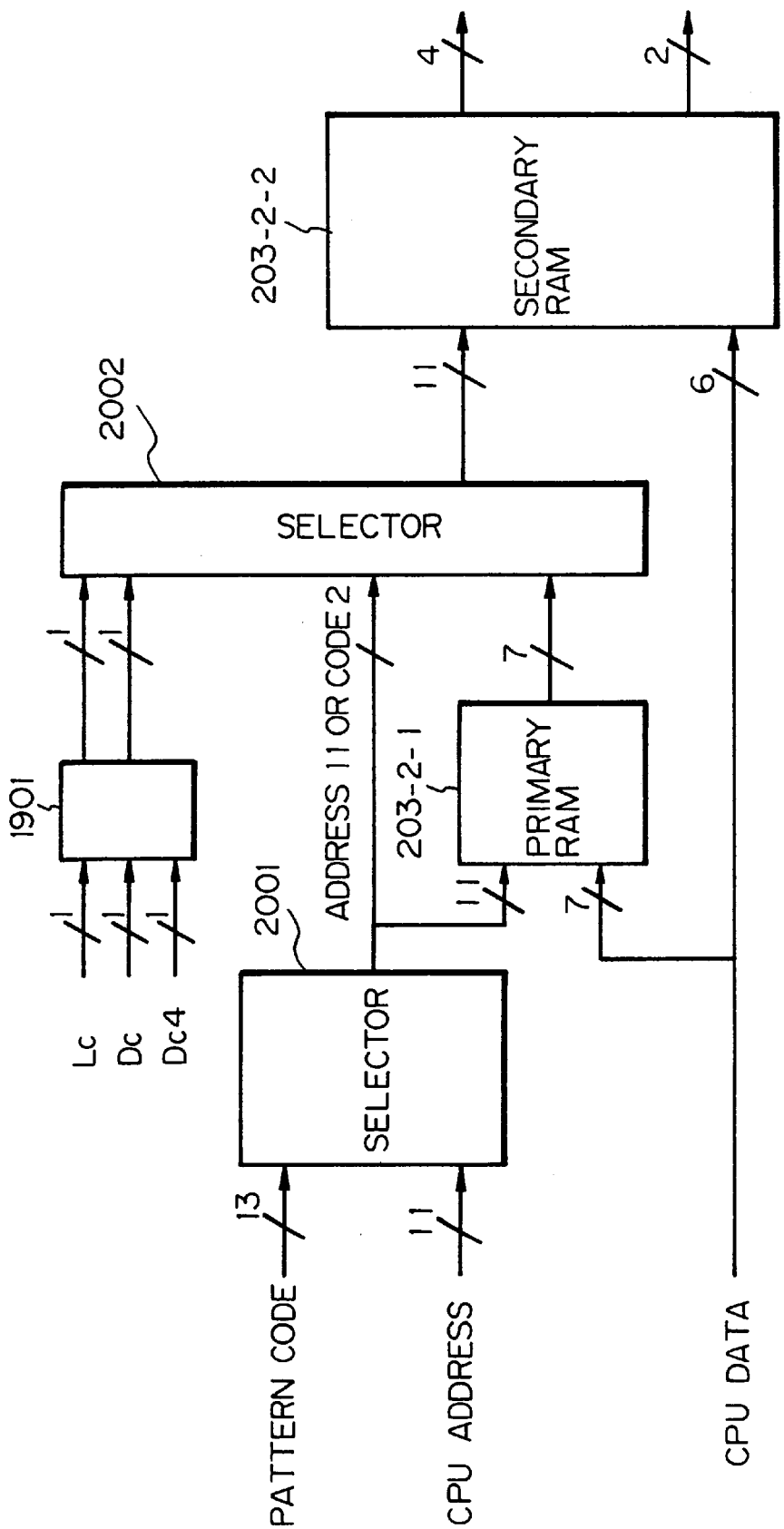

FIGS. 19 and 20 demonstrate how the correction RAM 203-2 of the jaggy correction 203 is used. As shown, the correction RAM 203-2 is implemented as a primary RAM 203-2-1 and a secondary RAM 203-2-2 in order to reduce the required memory capacity.

Specifically, FIG. 19 shows a procedure beginning with code generation and ending with density correction. As shown, the code generator 203-1 generates a thirteen-bit code representative of the characteristic of a jaggy. On the other hand, the buffer RAM controller 103 outputs a signal Lc indicative of the order in which lines should be read out. The P/S conversion 106-2 selectively outputs one of dot repetition orders Dc and Dc4. The dot repetition order Dc is a dot count for using the same pixel twice in the double density mode in the main scanning direction. The dot repetition order Dc4 is a dot count for using the same pixel four times in the quadruple density mode in the main scanning direction. The signals Lc, Dc and Dc4 are selected on the basis of the conversion density mode in the main scanning direction and the conversion density mode in the subscanning direction.

Eleven bits of the generated code other than dir are input to the address of the primary RAM 203-2-1. In response, an intermediate code corresponding to the input code is output from the RAM 203-2-1 in the form of seven-bit information. The intermediate code is a programmable value and is variable by tuning for image quality adjustment. The seven-bit intermediate code and generated dir, R1 and R0 are input to the address of the secondary RAM 203-2-2. The secondary RAM 203-2-2 stores in its corresponding address correction image information corresponding to lines, arcs, order of pixels assigned to density conversion in the main scanning direction, and order of lines assigned to density conversion in the subscanning direction, in the form of six-bit data relating to density and phase. The pixel data are corrected by the two RAMs 203-2-1 and 203-2-2 on the basis of the above generated code.

FIG. 20 demonstrates the writing of data in the primary and secondary RAMs 203-2-1 and 203-2-2. First, the external CPU accesses the RAMs in order to download data. Selectors 2001 and 2002 precede the RAMs 203-2-1 and 203-2-2, respectively, in order to select either address information received from the CPU or code data information appearing during usual operation. In this configuration, the RAMs 203-2-1 and 203-2-2 each is selectively operated in the write mode or the read mode.

The RAMS 203-2-1 and 203-2-2 each has a respective even channel and an odd channel. While the contents of the even channel and odd channel are basically identical in the RAM 203-2-1, they are switched in various ways in the RAM 203-2-2 in accordance with the density conversion mode.

FIGS. 21–27 show, mode by mode, read control relating to the buffer RAM 102 and data stored in the secondary RAM 203-2-2. In each of FIGS. 21–27, a circle in the buffer RAM 102 shows the center line of a group of nine lines to be fed to the even channel. The signals Lc, Dc and Dc4 mentioned earlier are fed to the RAM 203-2-2 in order to control the address of the RAM, although not shown specifically.

Figure 21:
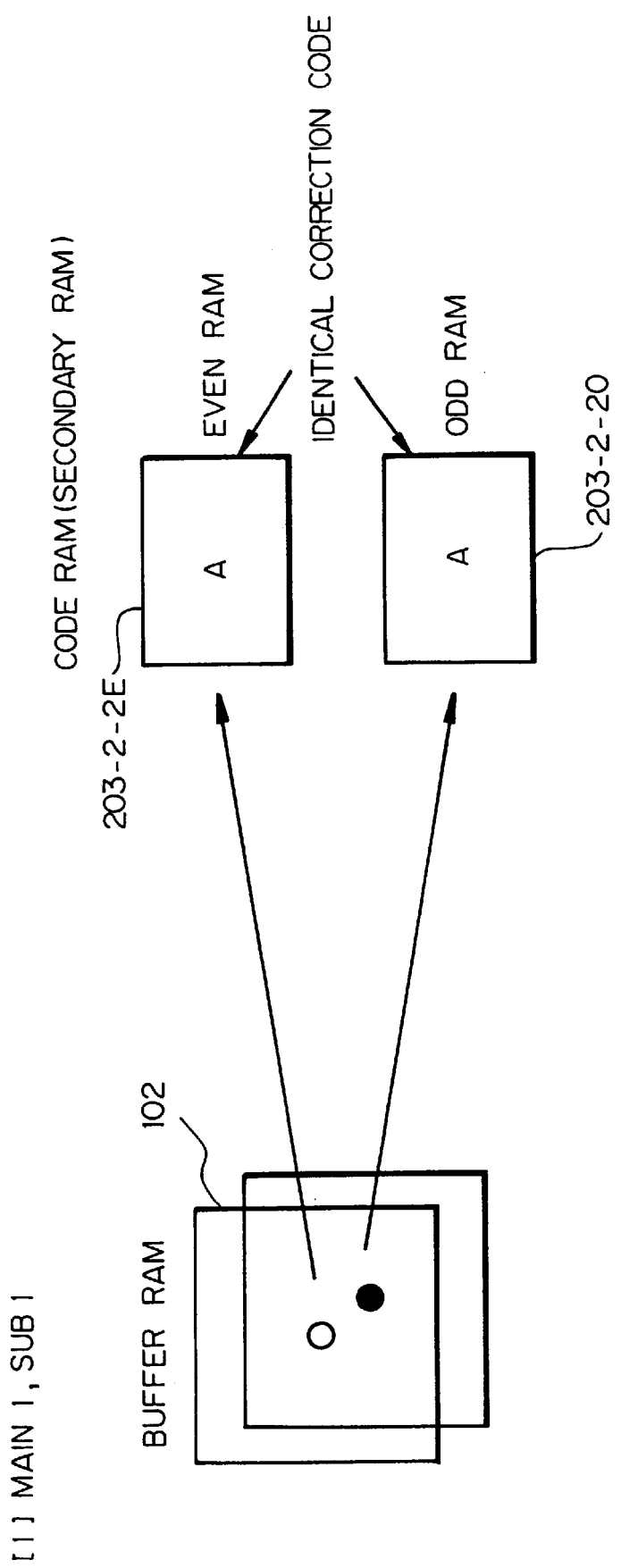
FIGS. 21–27 each demonstrates read control over the buffer RAM to occur in a particular mode and data written to secondary RAMs respectively assigned to an even channel and an odd channel.

FIG. 21 shows how an image is corrected when the single density mode is set up in both of the main and subscanning directions. As shown, the data on the even channel and the data on the odd channel stored in the buffer RAM 102 are deviated from each other by one line. Data to be downloaded to the secondary RAM 203-2-2E are identical on both of the even channel and odd channel. Because different line image data are fed for identical correction data, independent parallel processing is executed. In this case, density conversion is not effected at all.

Figure 22:
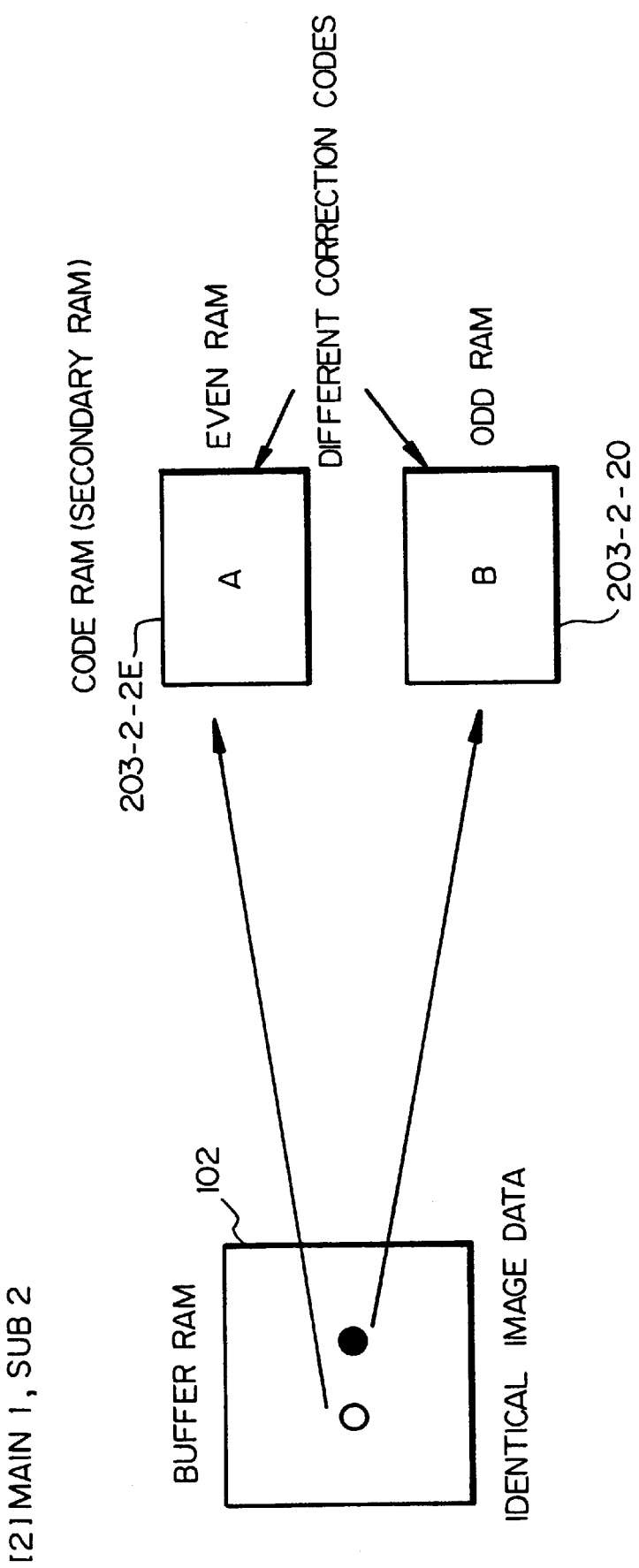

FIG. 22 shows how an image is corrected when the single density mode and double density mode are set up in the main scanning direction and subscanning direction, respectively. As shown, an identical image line data group is fed from the buffer RAM 102 to both of the even channel and odd channel. For the correction in the secondary RAM 203-2-2, a particular correction code is downloaded for each of the even channel and odd channel. The same image data are corrected in a particular manner line by line and doubled in density in the subscanning direction thereby.

Figure 23:
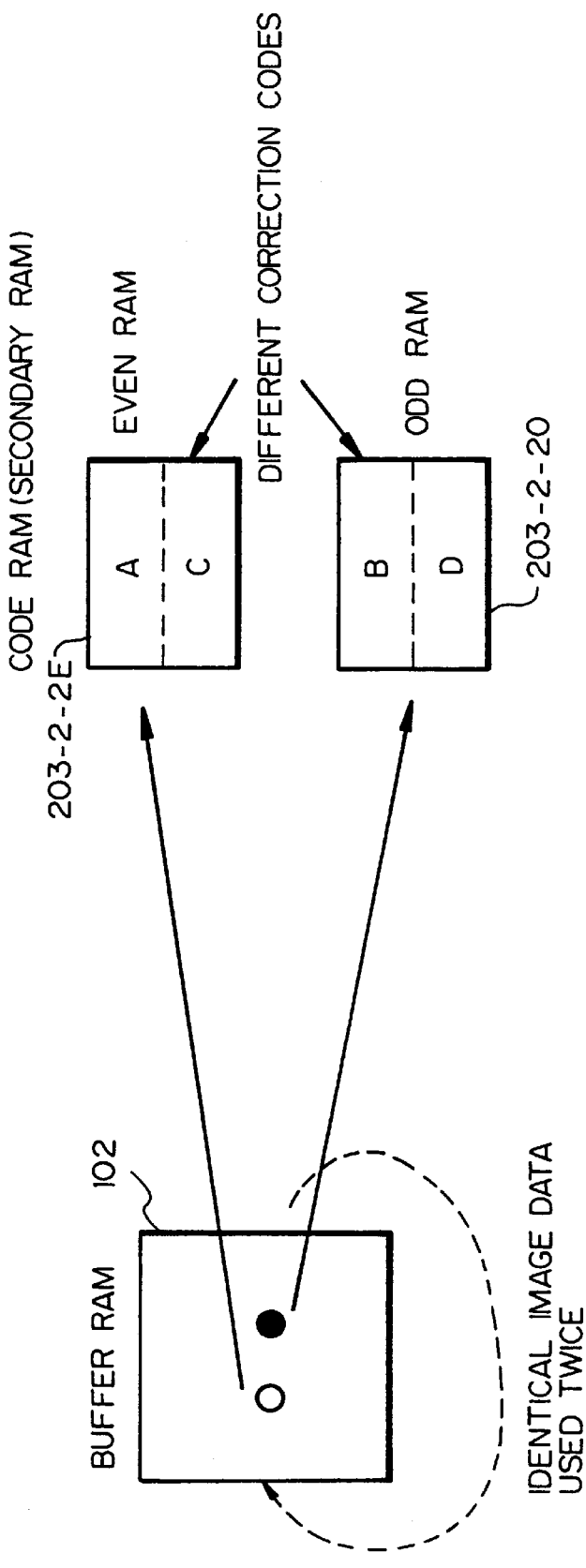

FIG. 23 shows how an image is corrected when the single density mode and quadruple density mode are set up in the main scanning direction and subscanning direction, respectively. As shown, an identical image line data group is fed from the buffer 102 to both of the even channel and odd channel in the same manner as in the double density mode. These data are read out twice while the signal Lc indicative of the reading order is transferred to the secondary RAM 203-2-2. While particular correction data is downloaded to each of the even channel and odd channel of the secondary RAM 203-3-3, correction data to be referenced by data read first and correction data to be referenced by data read next and downloaded to the RAM 203-2-2 are different from each other. Particular processing is executed with the same input image data every four output lines so as to implement quadruple density in the subscanning direction.

Figure 24:
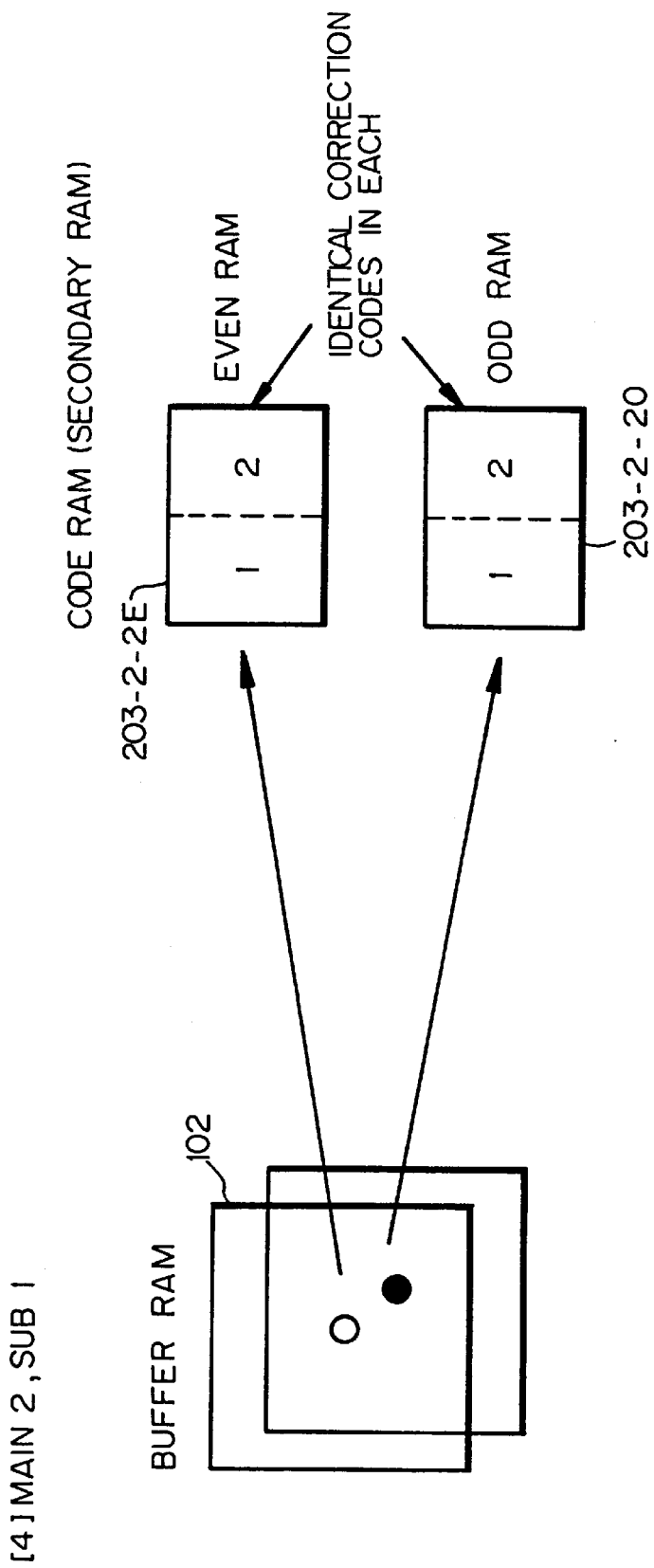

FIG. 24 shows how an image is corrected when the double density mode and single density mode are set up in the main scanning direction and subscanning direction, respectively. As shown, in the buffer RAM 102, data to be fed to the even channel and odd channel, respectively, are deviated from each other by one line. The P/S conversion 106-2 transfers a flag Dc indicative of an order in which one pixel should be processed to the secondary RAM 203-2-2. Identical data are downloaded to both of the even channel and odd channel of the secondary RAM 203-3-2. Further, correction data to be referenced at the time of the first correction in the main scanning direction and correction data to be referenced at the time of the second correction are downloaded with different contents from each other. Because different line image data are fed for the same correction data, independent parallel processing is executed. As for the main scanning direction, the correction data are varied on the basis of the dot processing order for thereby implementing double density.

Figure 25:
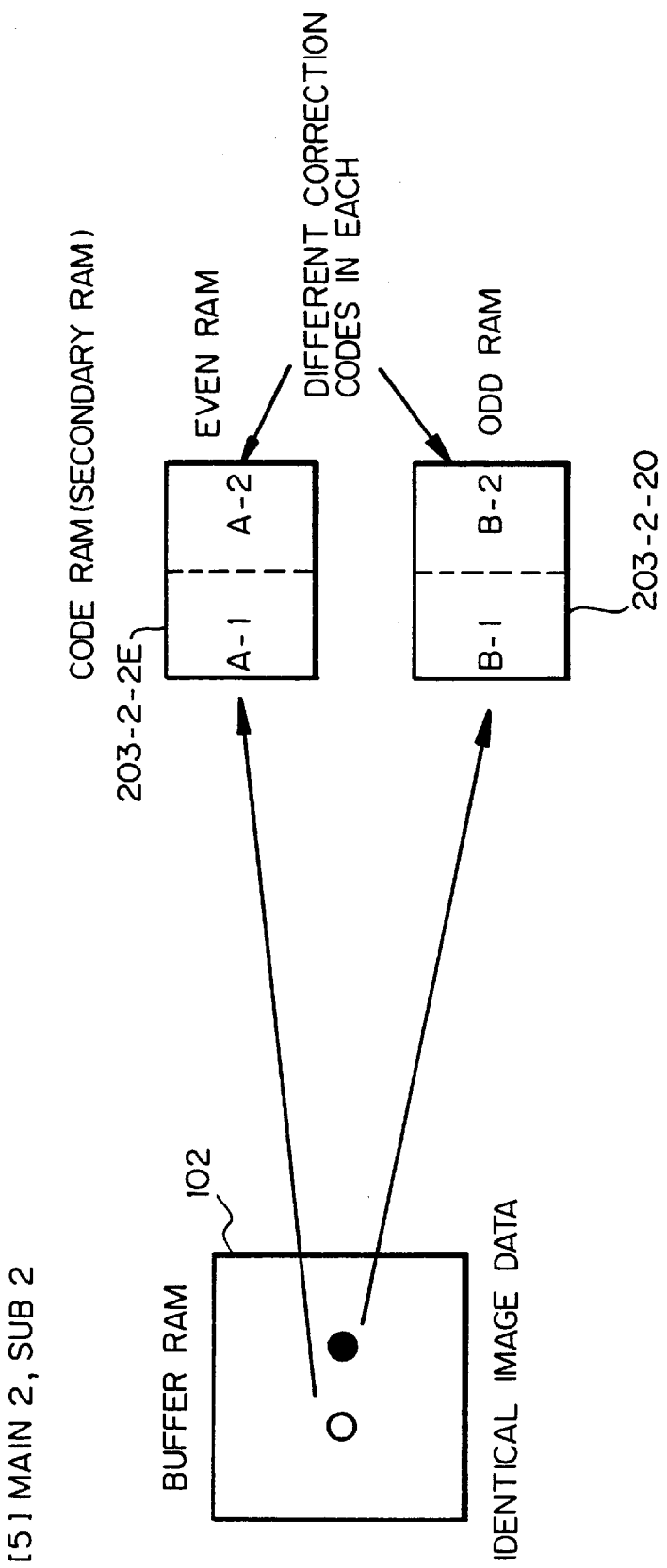

FIG. 25 shows how an image is corrected when the double density mode is set up in both of the main and subscanning directions. An identical image line data group is output from the buffer RAM 102 to both of the even channel and odd channel. The P/S conversion 106-2 transfers to the secondary RAM 203-2-2 the flag Dc indicative of the order in which one pixel should be processed. Particular correction data are downloaded to each of the even channel and odd channel of the RAM 203-2-2. Further, the RAMs 203-2-2E and 203-2-2O each are downloaded with correction data which differs from the first time of correction in the main scanning direction to the second time of correction in the same direction. Particular correction is effected with the same image data for each output line to thereby implement the double density in the subscanning direction. As for the main scanning direction, the correction data are varied on the basis of the dot processing order so as to implement double density.

Figure 26:
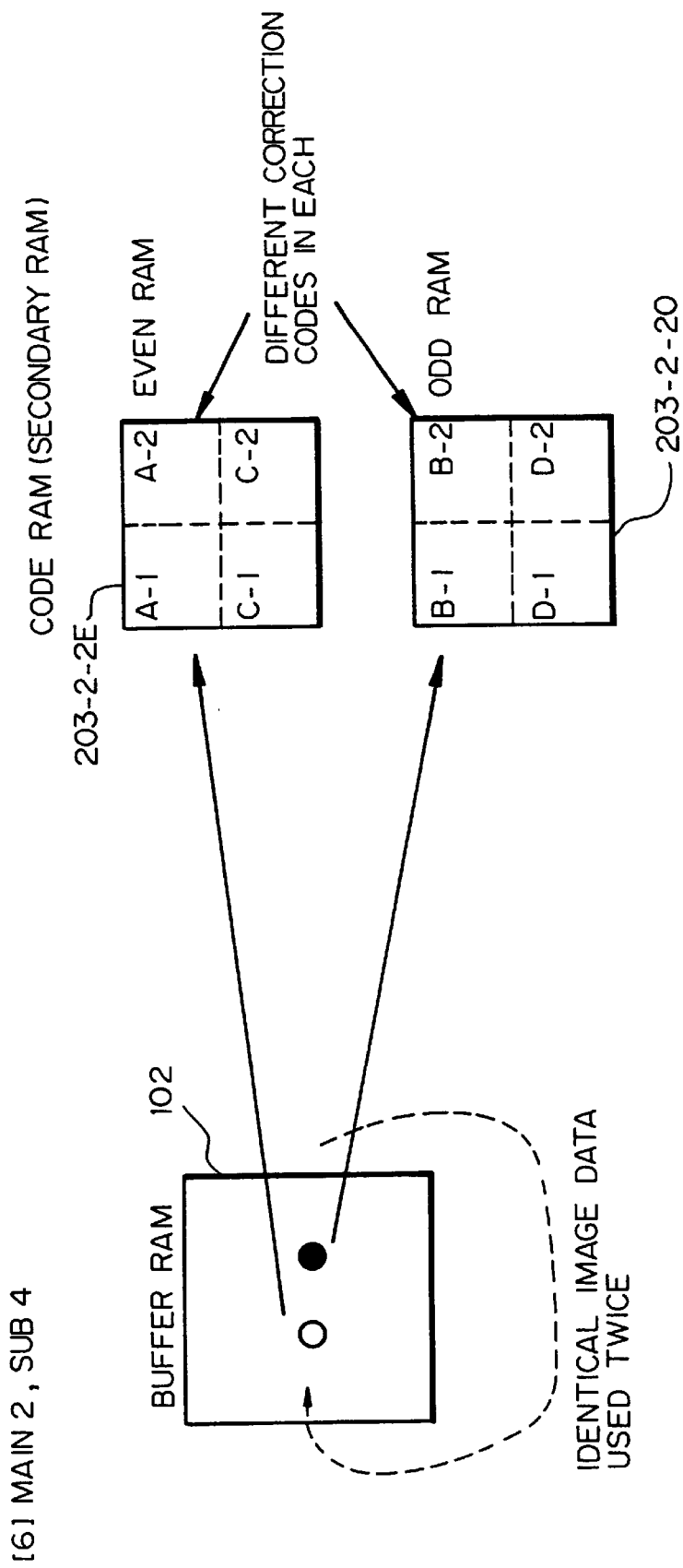

FIG. 26 shows how an image is corrected when the double density mode and quadruple density mode are set up in the main scanning direction and subscanning direction, respectively. As shown, an identical image line data group is output from the buffer RAM 102 to both of the even channel and odd channel. These data are read out twice while the flag Lc indicative of the reading order is transferred to the secondary RAM 203-2-2. Particular correction data are downloaded to each of the even channel and odd channel of the RAM 203-2-2. Further, the RAMs 203-2-2E and 203-2-2O each are downloaded with particular correction data to be referenced for each of the first and second data read out. This is also true with density conversion in the main scanning direction. Particular processing is executed every four output lines with identical input image data so as to implement the quadruple density in the subscanning direction. As for the main scanning direction, the correction data are varied on the basis of the dot processing order to thereby implement the double density.

Figure 27:
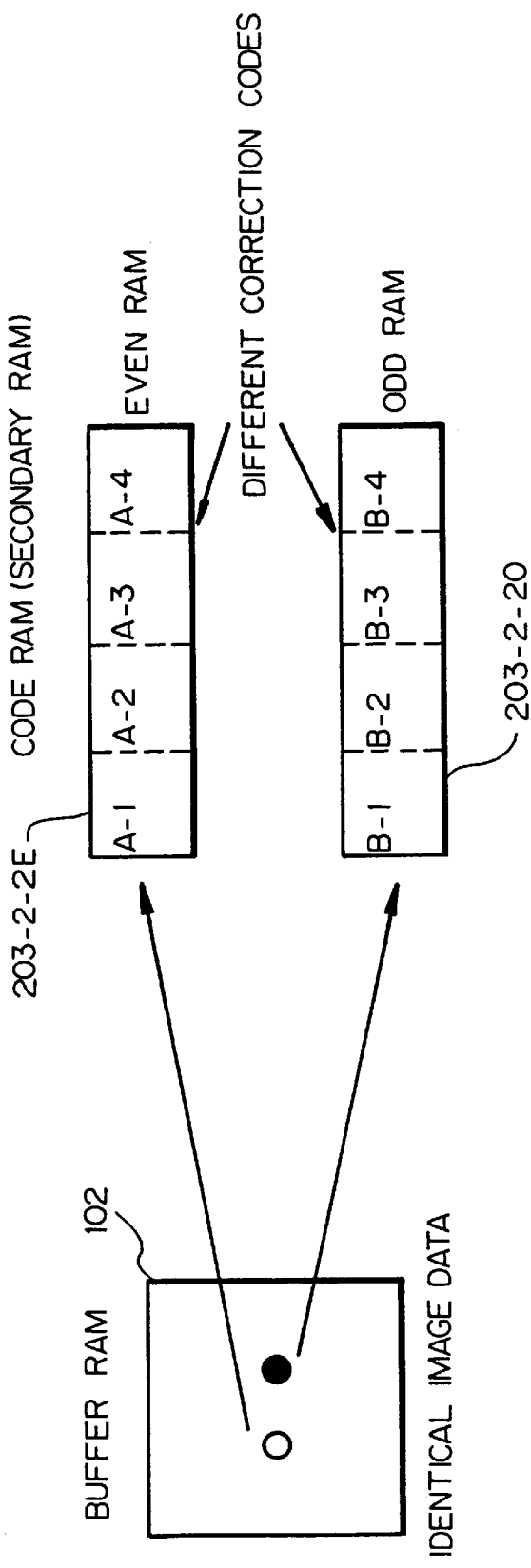

FIG. 27 shows how an image is corrected when the quadruple density mode and double density mode are set up in the main scanning direction and subscanning direction, respectively. As shown, an identical image line data group is output from the buffer RAM 102 to both of the even channel and odd channel. The P/S conversion 106-2 transfers the signals Dc and Dc4 indicative of a one pixel processing order to the secondary RAM 203-2-2. Particular correction data are input to the RAM 203-2-2 for each of the even channel and odd channel. Further, the RAMs 203-2-2E and 203-2-2O each are downloaded with correction data which differs between the first, second, third and fourth times of correction in the main scanning direction. Particular correction is effected for each output line with identical image there so as to implement the double density in the subscanning direction. As for the main scanning direction, the dot processing order is controlled by Dc and Dc4 so as to implement the quadruple density.

Figure 28:
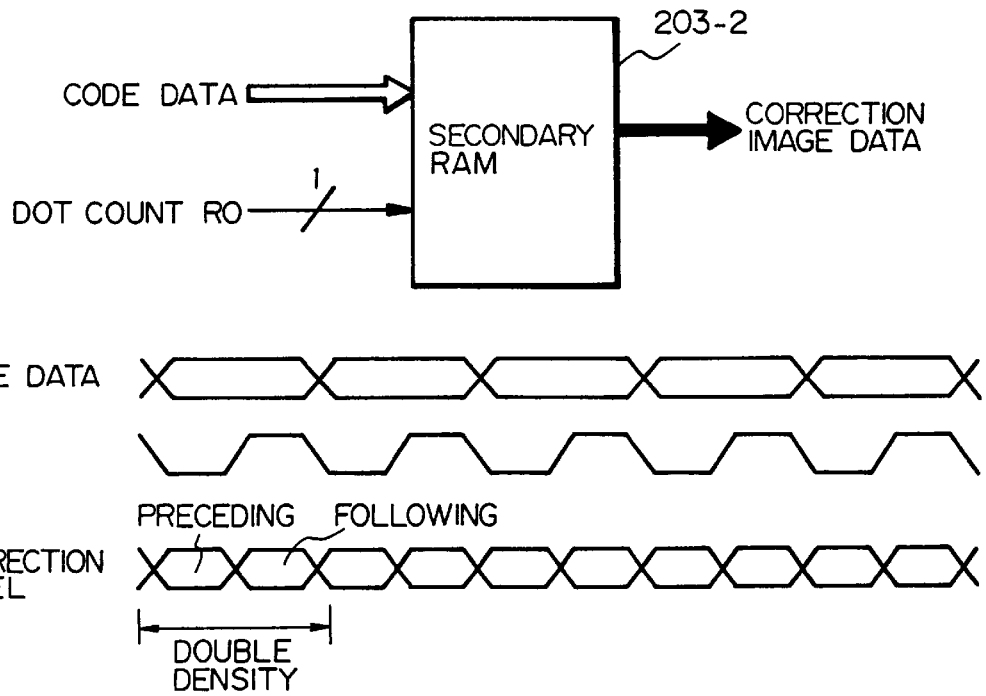
FIG. 28 shows conversion to the double density in the main scanning direction.

FIGS. 28 and 29 show density conversion in the main scanning direction. As shown, dot counters Dc and Dc4 are respectively assigned to R0 and R1. R0 and R1 are substituted for the upper portion of the input address of the secondary RAM 203-2. Specifically, FIG. 28 shows the double density processing in the main scanning direction. As shown, dot counter information R0 indicative of the preceding and following pixels is added to the same code information, so that the RAM 203-2 outputs different correction pixel information. In FIG. 28, the preceding pixel and following pixel are respectively generated when the signal R0 is in its low level and when it is in its high level. As a result, correction pixels doubled in density are generated for a single code information.

As shown in FIG. 29, in the quadruple density mode in the main scanning direction, two bits (R1 and R0) of dot counter information indicative of the first, second, third and fourth pixels are added to identical code information, so that the RAM 203-2 outputs different correction pixel information. Specifically, the first, second, third and fourth pixels are generated when R1 and R0 both are in low levels, when R1 and R0 are respectively in a low level and a high level, when R1 and R0 are respectively in a high level and a low level, and when R1 and R0 both are in high levels. As a result, correction pixels quadruple in density are generated from a single code information.

FIG. 30 demonstrates the quadruple density mode in the main scanning direction, particularly 100 dpi to 400 dpi conversion. Image density written to the buffer RAM 102 and having a density of 100 dpi are read out in synchronism with a clock paclk read enable (penable) control. The data read out in parallel, labeled P1, are held for four pulses of the clock paclk. The P/S conversion 106-2 converts the data P1 to serial data, i.e., data S1-S8 corresponding to eight pixels. This conversion is effected in synchronism with a clock wclk by controlling an enable signal srenable. The individual serial data is held for four clock pulses of the clock wclk. The jaggy correction 203 generates codes for such a group of image data. Codes C1-C8 correspond the the code data generated by pattern matching and are input to the primary RAM 203-2-1. An output is generated with the same time series with the input codes. The P/S conversion 106-1 generates the flags Dc and Dc4 at the same time. The flags Dc and Dc4 are respectively transformed to R1 and R0 and input to the secondary RAM 203-2-2. The codes input to the RAM 203-2-2 are quadrupled in density by R0 and R1 and transformed to 400 dpi correction image thereby.

In summary, it will be seen that the present invention provides an image processing device having various unprecedented advantages, as enumerated below.

(1) Data conversion and transformation to multilevel image data for simultaneously writing two lines are effected during the interval between the output of data from temporary storage means and the output of the same from means for selecting multilevel image data. This realizes high speed and accurate writing control.

(2) Bilevel/multilevel conversion of image data is adaptive to all of line images, error scattered images and dither processed images, implementing highly accurate writing control.

(3) Density conversion with bilevel image can be easily executed in the subscanning direction, also realizing high speed and accurate writing.

(4) Density conversion with bilevel image can be easily executed in the main scanning direction, also realizing high speed and accurate writing. In addition, required pattern correction data can be rapidly downloaded.

Various modifications will become possible for those skilled in the art after receiving the teachings of the present disclosure without departing from the scope thereof.

What is claimed is:

1. An image processing device for processing input image data in order to allow two lines of said input image data to be processed at the same time, comprising:

data bus control means for controlling a parallel data width of said input image data;

temporary storage means for temporarily storing said input image data;

data storage control means for controlling writing and reading of said input image data into and out of, respectively, said temporary storing means, said data storage control means controlling reading of two lines of said input image data representing input bilevel image data at the same time, and reading of two lines of said input image data representing input multilevel image data at the same time;

data converting means for converting each of said lines of said input image data from parallel data to serial data, said data converting means varying a transfer rate of each of said lines of said input image data;

multilevel means for transforming the two lines of serial data representing said input bilevel image data to multilevel image data;

data selecting means for selecting between the two lines of serial data transformed to multilevel image data and the two lines of serial data representing said input multilevel data; and register control means for executing register control with at least data stored in storing means included in said multilevel means;

wherein said converting each of said lines of said input image data, and in the case of said input bilevel image data, said transforming the two lines of serial data representing the input bilevel image data to multilevel image data, are effected before either of said two lines of serial data are output from said data selecting means.

2. A device as claimed in claim 1, wherein said multilevel means comprises:

means for forming an image matrix;

jaggy correcting means for executing jaggy correction by pattern matching;

solitary point detecting means for detecting a solitary point in the image matrix;

solitary point removing means for removing the solitary point detected;

bilevel error scattering means for executing bilevel error scattering;

texture removing means for removing a texture of an image output from said bilevel error scattering means;

bilevel dither processing means for executing bilevel dither processing;

smoothing means for smoothing an image output from said bilevel dither processing means; and edge processing means for transforming data representative of an edge portion of a bilevel image to multilevel data.

3. A device as claimed in claim 2, wherein said jaggy correcting means comprises:

said data storing means for storing data for correction;

first writing means for writing each data in a particular address of said data storing means;

second writing means for writing identical data in different addresses of said data storing means at the same time; and switching means for switching writing effected by said first writing means and writing effected by said second writing means in accordance with a write mode.

4. A device as claimed in claim 1, wherein said data control means comprises:

means for selecting a particular address of said temporary storage means for each of a multilevel mode and a bilevel mode; and means for varying toggle control over writing and reading of said temporary storage means for each of the multilevel mode and the bilevel mode which is selectively effected with a single density, a double density or a quadruple density.

5. An image processing system for processing input image data for processing two lines of said input image data at the same time, comprising:

a data bus controller for controlling a parallel data width of said input image data;

a temporary storage device for temporarily storing said input image data;

a data storage controller configured to control writing and reading of said input image data into and out of, respectively, said temporary storage device, said data storage controller controlling reading of two lines of said input image data representing input bilevel image data at the same time, and reading of two lines of said input image data representing input multilevel image data at the same time;

a parallel to serial data converter for converting each of said lines of said input image data from parallel data to serial data, said data converting means varying a transfer rate of each of said lines of said input image data;

a device configured to transform the two lines of serial data representing said input bilevel image data to multilevel image data;

a data selector configured to select between the two lines of serial data transformed to multilevel image data and the two lines of serial data representing said input multilevel data; and a register controller configured to execute register control with at least data stored in a first data storage area included in said device configured to transform, wherein said converting each of said lines of said input image data, and in the case of said input bilevel image data, and said transforming the two lines of serial data representing the input bilevel image data to multilevel image data, are effected before either of said two lines of serial data are output from said data selector.

6. A system as claimed in claim 5, wherein said device configured to transform comprises:

a device configured to form an image matrix;

a device configured to execute jaggy correction by pattern matching;

a detector configured to detect a solitary point in the image matrix;

a device configured to remove the solitary point detected;

a device configured to execute bilevel error scattering;

a device configured to remove a texture of an image output from said device configured to execute bilevel error scattering;

a device configured to execute bilevel dither processing;

a device configured to smooth an image output from said device configured to execute bilevel dither processing; and a device configured to transform data indicating an edge portion of a bilevel image to multilevel data.

7. A system as claimed in claim 6, wherein said device configured to execute jaggy correction comprises:

a second data storage area configured to store data for correction;

a first writing device configured to write each data in a particular address of said second data storage area;

a second writing device configured to write identical data in different addresses of said second data storage area at the same time; and a device configured to switch writing effected by said first writing device and writing effected by said second writing device in accordance with a write mode.

8. A system as claimed in claim 5, wherein said data storage controller comprises:

a selector for selecting a particular address of said temporary storage device for each of a multilevel mode and a bilevel mode; and a device configured to vary toggle control over writing and reading of said temporary storage device for each of the multilevel mode and the bilevel mode which is selectively effected with a single density, a double density or a quadruple density.

* * * * *